United States Patent
Polshettiwar et al.

(10) Patent No.: US 9,937,459 B2
(45) Date of Patent: Apr. 10, 2018

(54) MATERIALS FOR GAS CAPTURE, METHODS OF MAKING MATERIALS FOR GAS CAPTURE, AND METHODS OF CAPTURING GAS

(71) Applicant: King Abdullah University of Science and Technology, Thuwal (SA)

(72) Inventors: Vivek Polshettiwar, Thuwal (SA); Umesh Patil, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 14/996,366

(22) Filed: Jan. 15, 2016

(65) Prior Publication Data
US 2016/0129386 A1 May 12, 2016

Related U.S. Application Data

(62) Division of application No. 13/709,155, filed on Dec. 10, 2012, now Pat. No. 9,272,262.

(60) Provisional application No. 61/576,416, filed on Dec. 16, 2011.

(51) Int. Cl.
| | | |
|---|---|---|
| B01D 53/02 | (2006.01) | |
| B01J 20/30 | (2006.01) | |
| B01J 20/02 | (2006.01) | |
| B01J 20/32 | (2006.01) | |
| B01J 20/06 | (2006.01) | |
| B01J 20/08 | (2006.01) | |
| B01J 20/10 | (2006.01) | |
| B01J 20/18 | (2006.01) | |

(52) U.S. Cl.
CPC ............. *B01D 53/02* (2013.01); *B01J 20/02* (2013.01); *B01J 20/0259* (2013.01); *B01J 20/06* (2013.01); *B01J 20/08* (2013.01); *B01J 20/103* (2013.01); *B01J 20/18* (2013.01); *B01J 20/3085* (2013.01); *B01J 20/3204* (2013.01); *B01J 20/3248* (2013.01); *B01D 2253/10* (2013.01); *B01D 2253/106* (2013.01); *B01D 2253/112* (2013.01); *B01D 2253/25* (2013.01); *B01D 2257/10* (2013.01); *B01D 2257/504* (2013.01); *B01D 2257/70* (2013.01); *Y02C 10/08* (2013.01)

(58) Field of Classification Search
CPC ........ B01D 2253/106; B01D 2253/112; B01D 2253/25; B01D 2257/504; B01D 53/02; B01J 20/02; B01J 20/0259; B01J 20/3085; B01J 20/3204; B01J 20/3248; Y02C 10/08
See application file for complete search history.

(56) References Cited

U.S. PATENT DOCUMENTS

| | | |
|---|---|---|
| 5,260,035 A | 11/1993 | Lachman et al. |
| 7,101,415 B2 | 9/2006 | Torres, Jr. et al. |
| 2005/0109356 A1* | 5/2005 | Reddy ............... A24B 15/28 131/334 |

(Continued)

*Primary Examiner* — Christopher P Jones
(74) *Attorney, Agent, or Firm* — Billion & Armitage; Benjamin C. Armitage

(57) ABSTRACT

In accordance with the purpose(s) of the present disclosure, as embodied and broadly described herein, embodiments of the present disclosure, in one aspect, relate to materials that can be used for gas (e.g., $CO_2$) capture, methods of making materials, methods of capturing gas (e.g., $CO_2$), and the like.

17 Claims, 17 Drawing Sheets

(56) References Cited

U.S. PATENT DOCUMENTS

| | | | |
|---|---|---|---|
| 2009/0071371 A1* | 3/2009 | Theodore | H01S 3/02 106/287.11 |
| 2009/0256259 A1 | 10/2009 | Kanaya | |
| 2012/0111324 A1 | 5/2012 | Kraft et al. | |
| 2013/0338001 A1* | 12/2013 | Giannelis | C01G 23/047 502/402 |

* cited by examiner

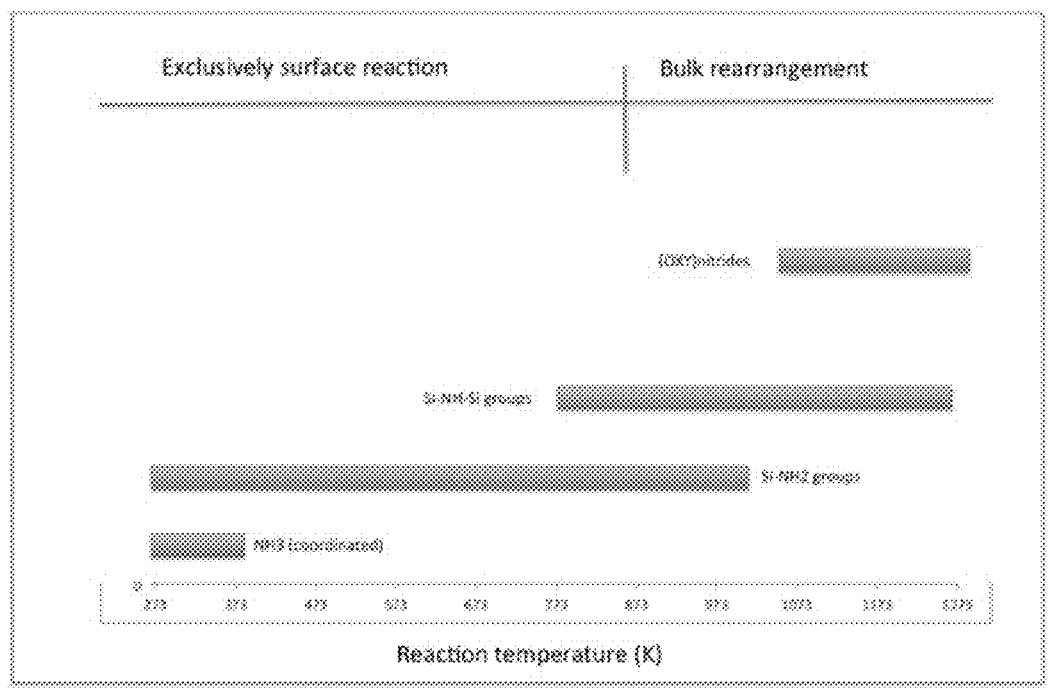
FIG. 1.1

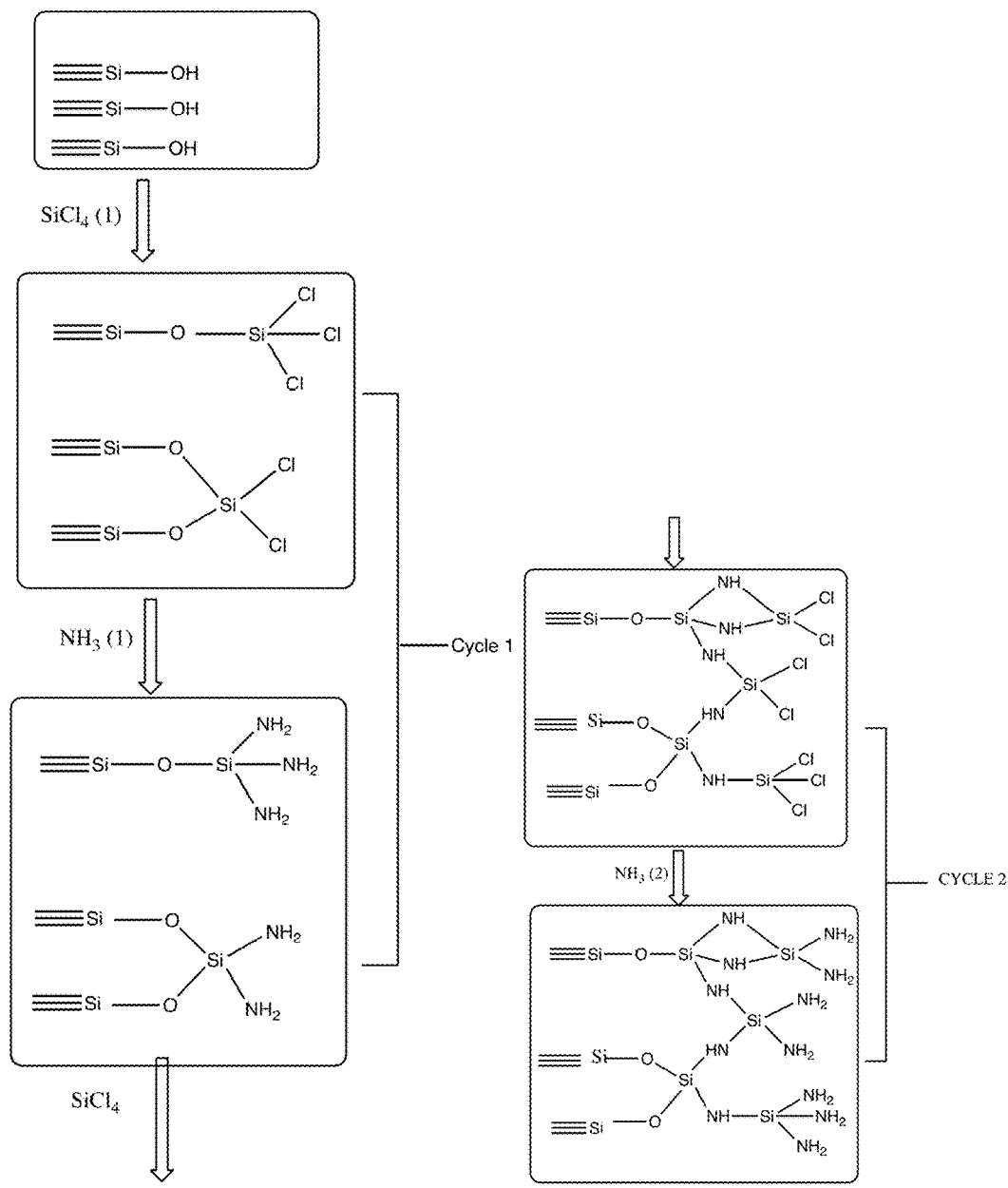
FIG. 1.2

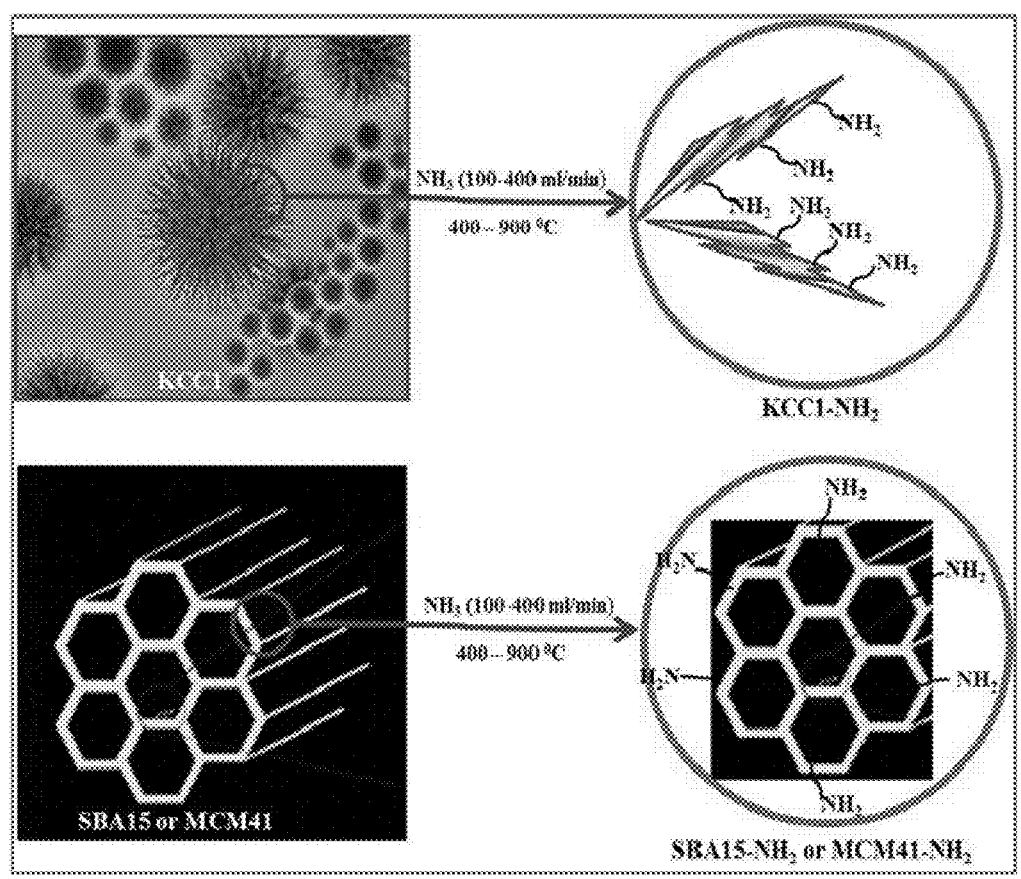
FIG. 2.1

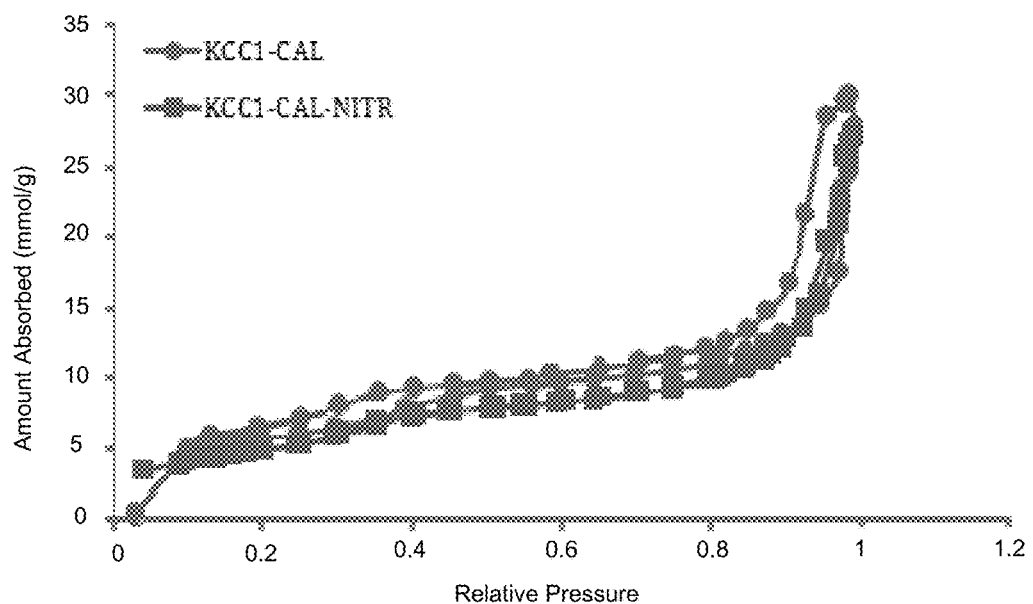
FIG. 2.2A
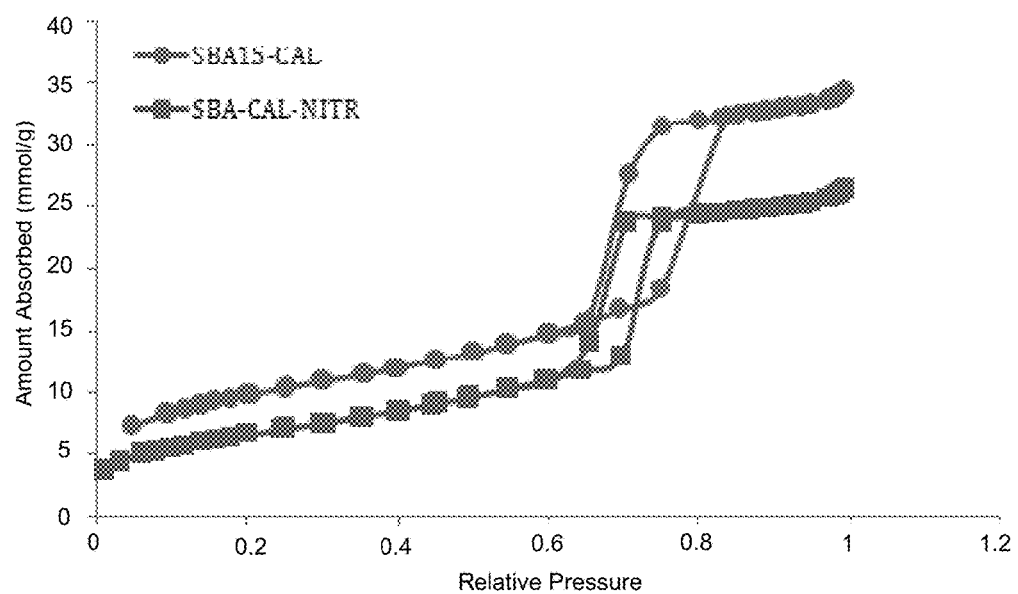
FIG. 2.2B

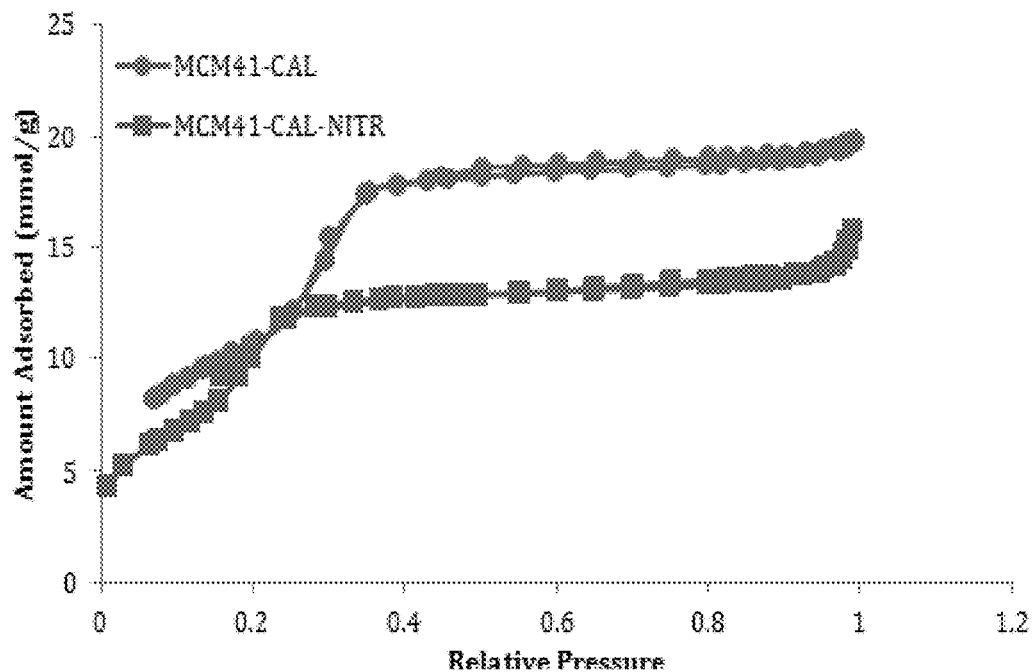
FIG. 2.2C
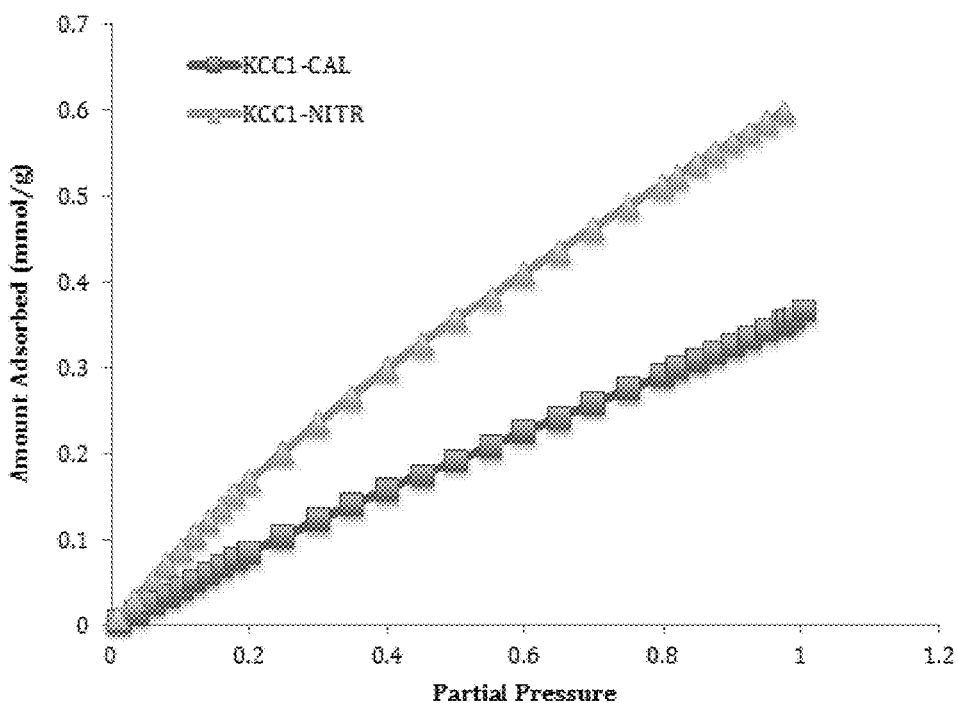
FIG. 2.3A

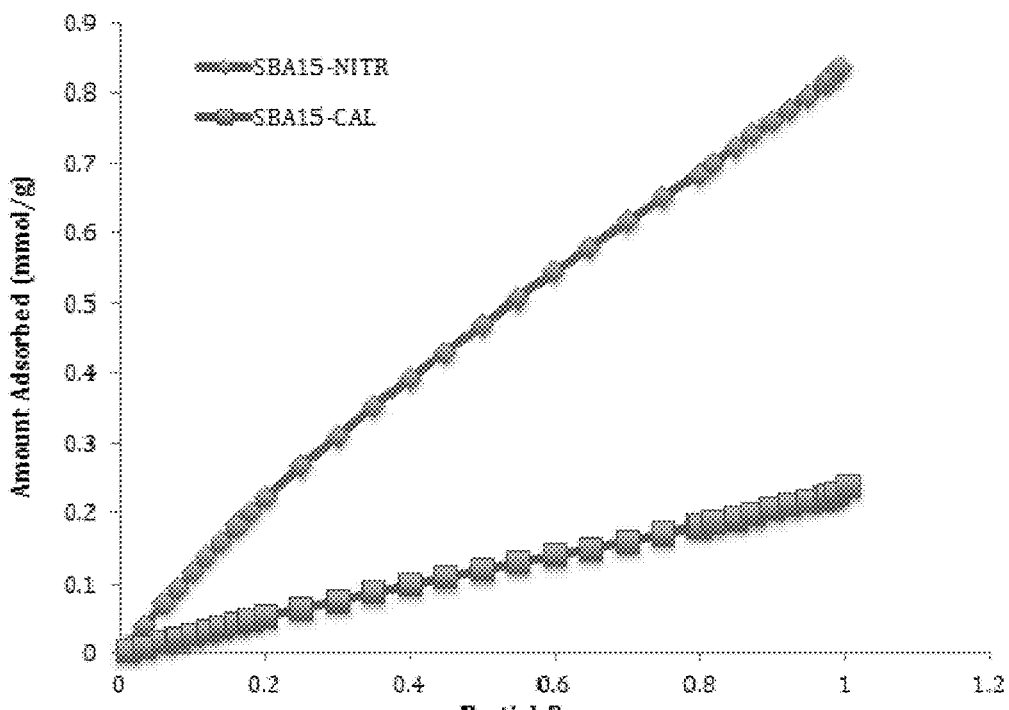
FIG. 2.3B
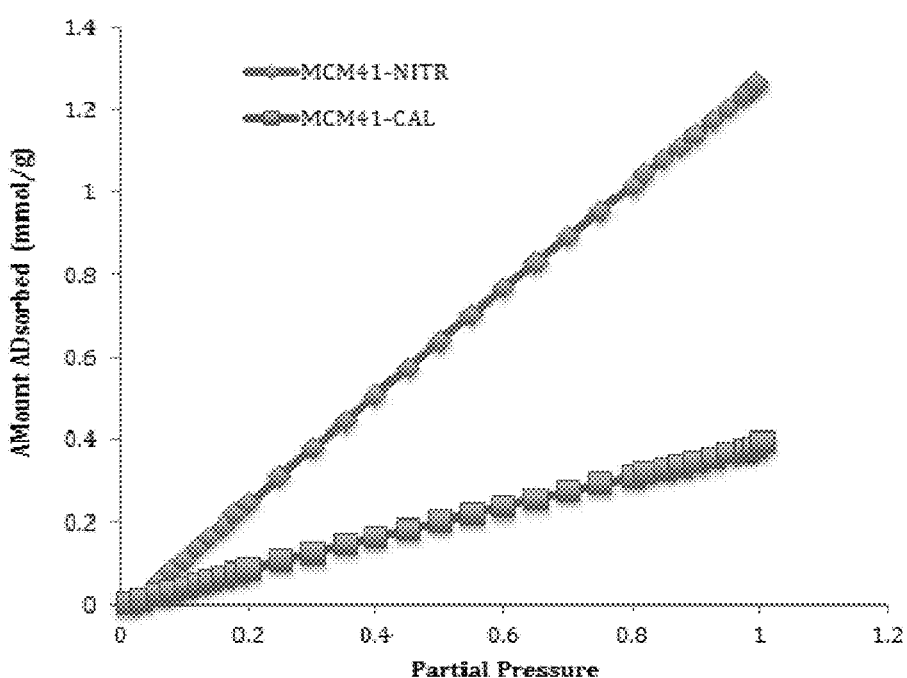
FIG. 2.3C

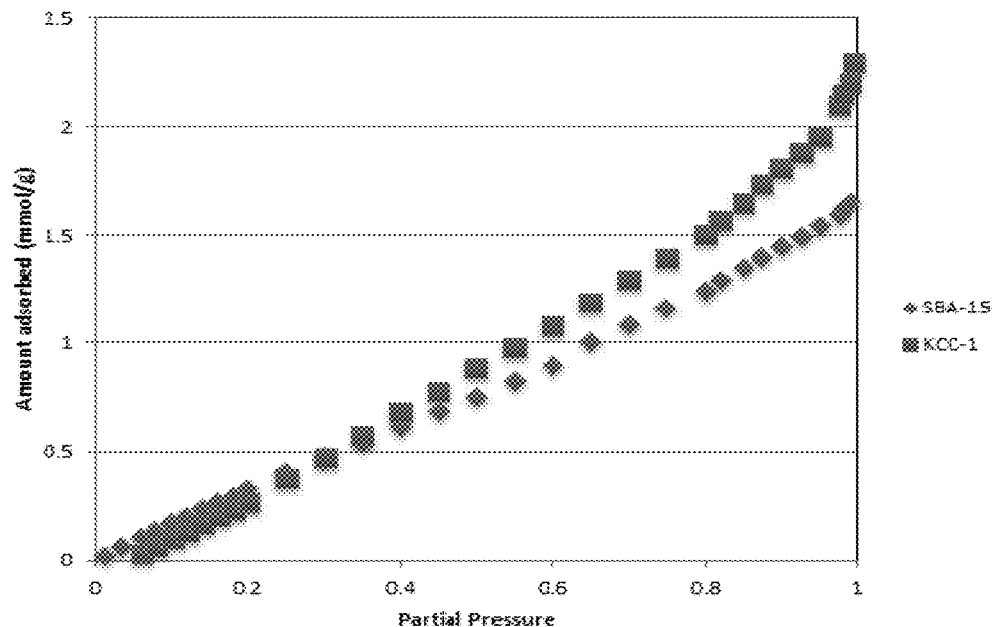
FIG. 2.4
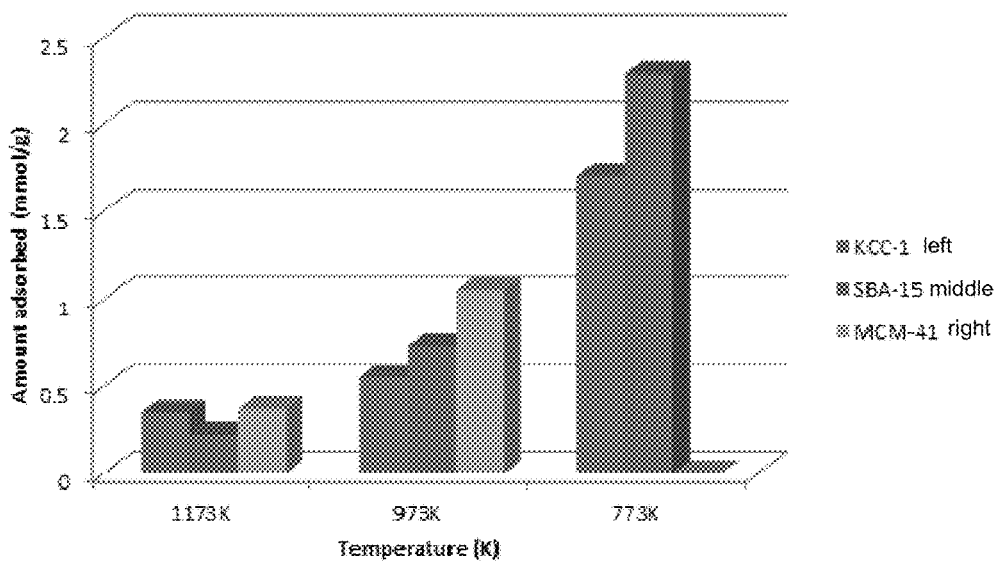
FIG. 2.5

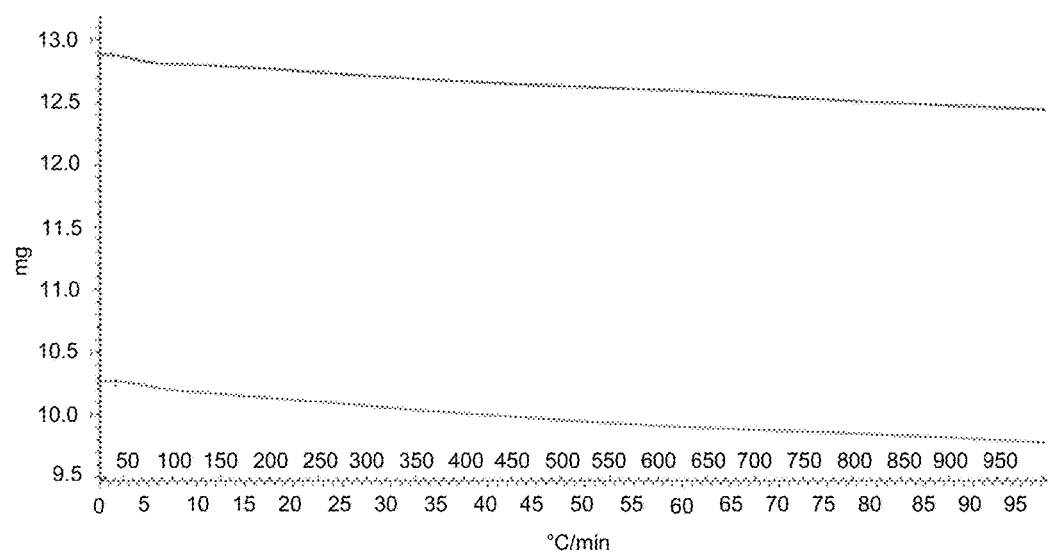
FIG. 2.6

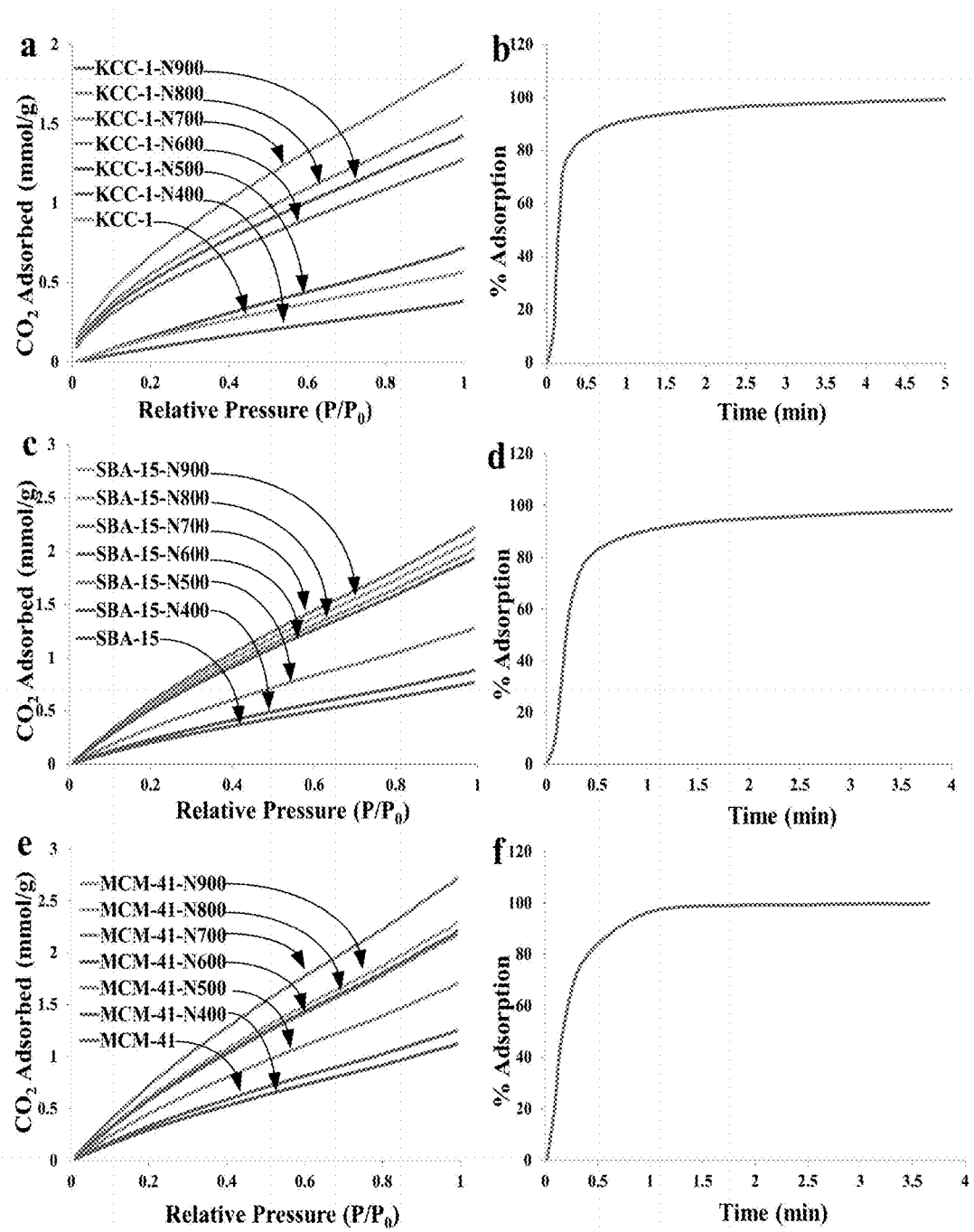
FIG. 3.1

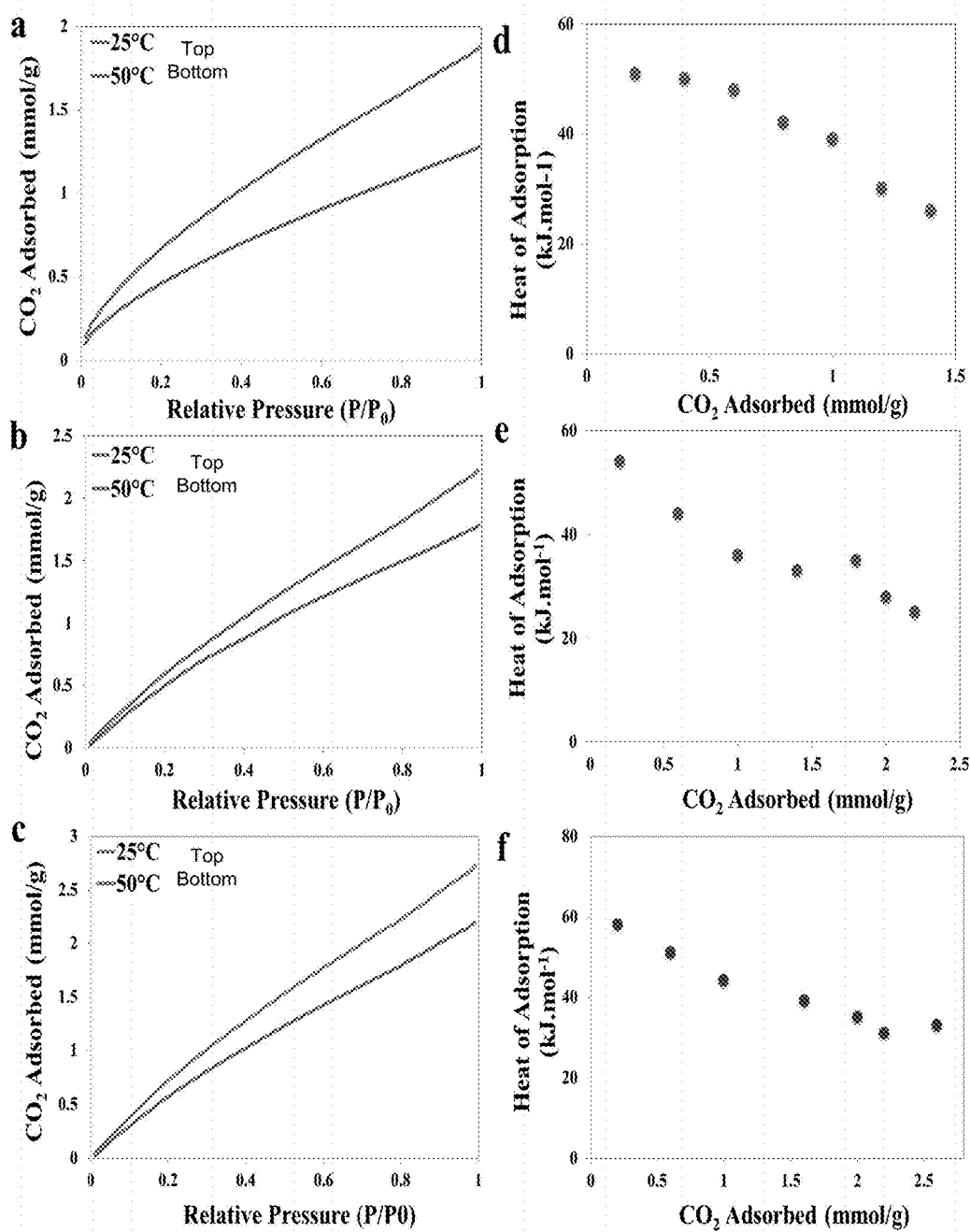
FIG. 3.2

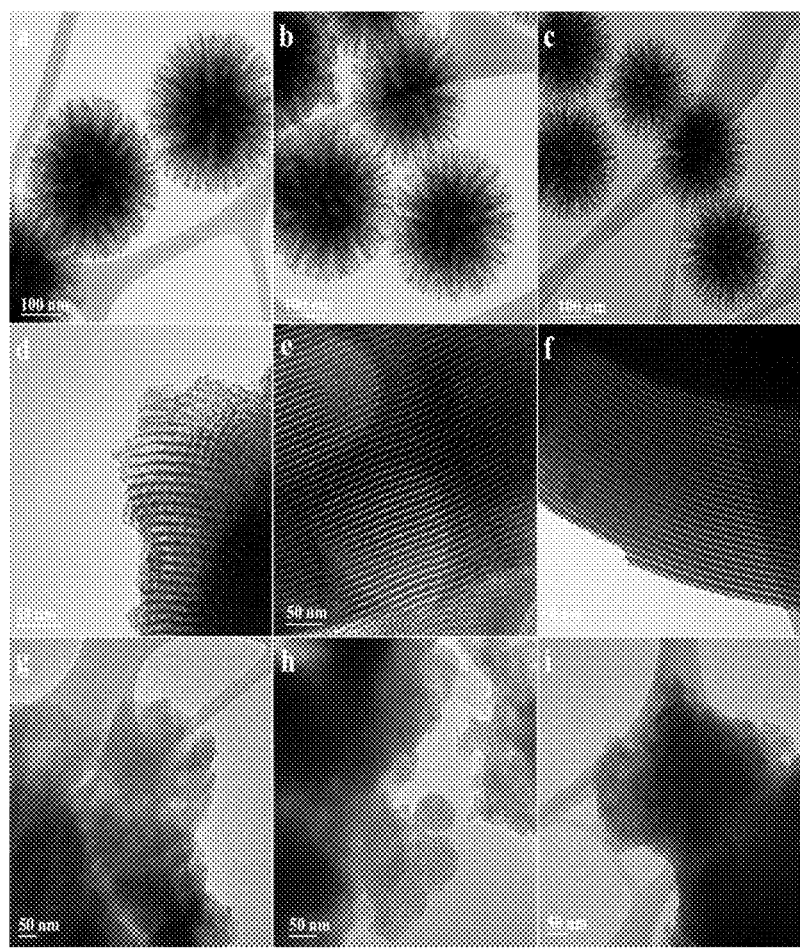
FIG. 3.3

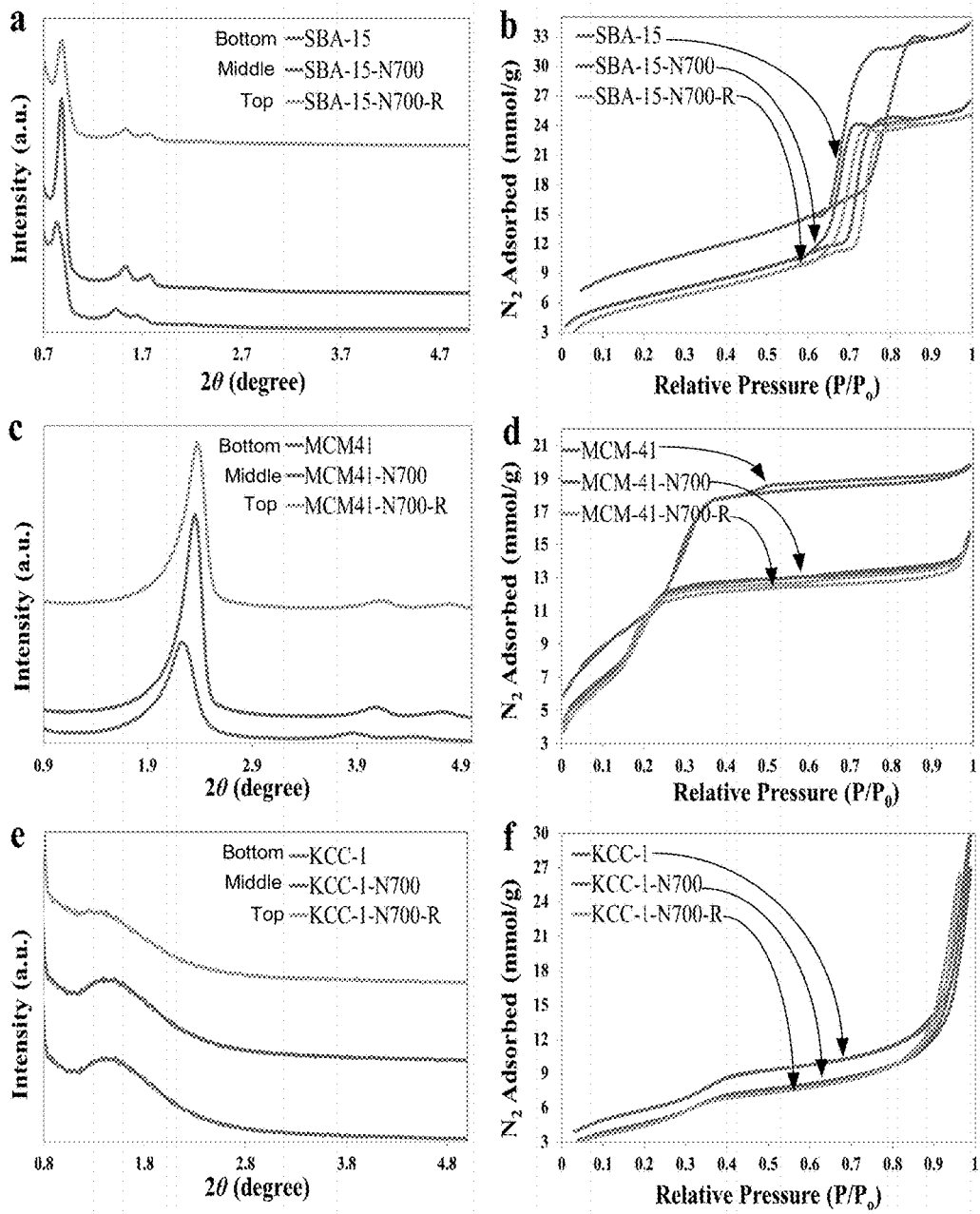
FIG. 3.4

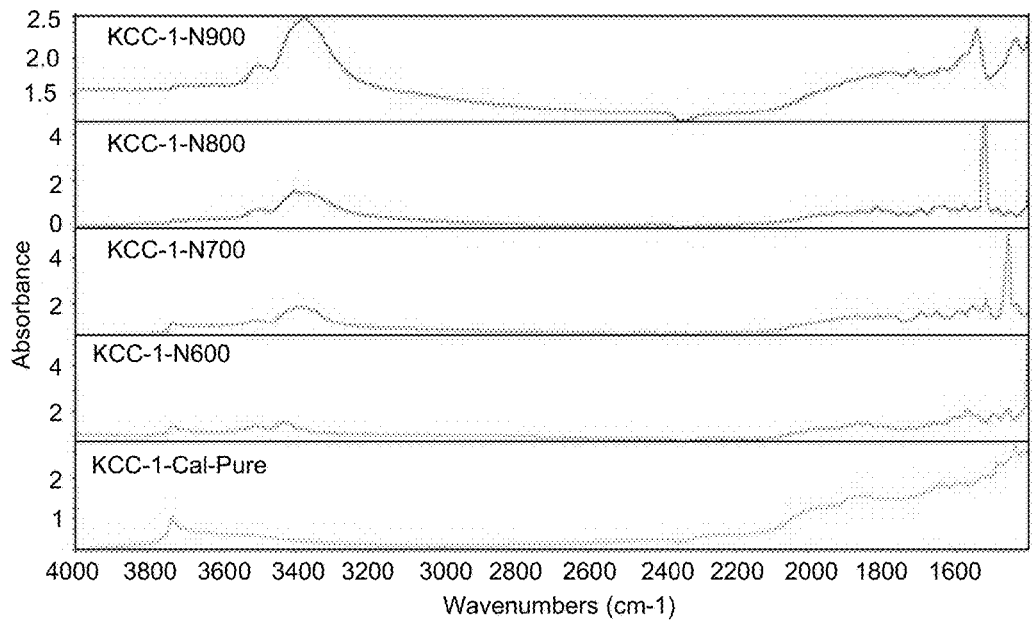
FIG. 3.5
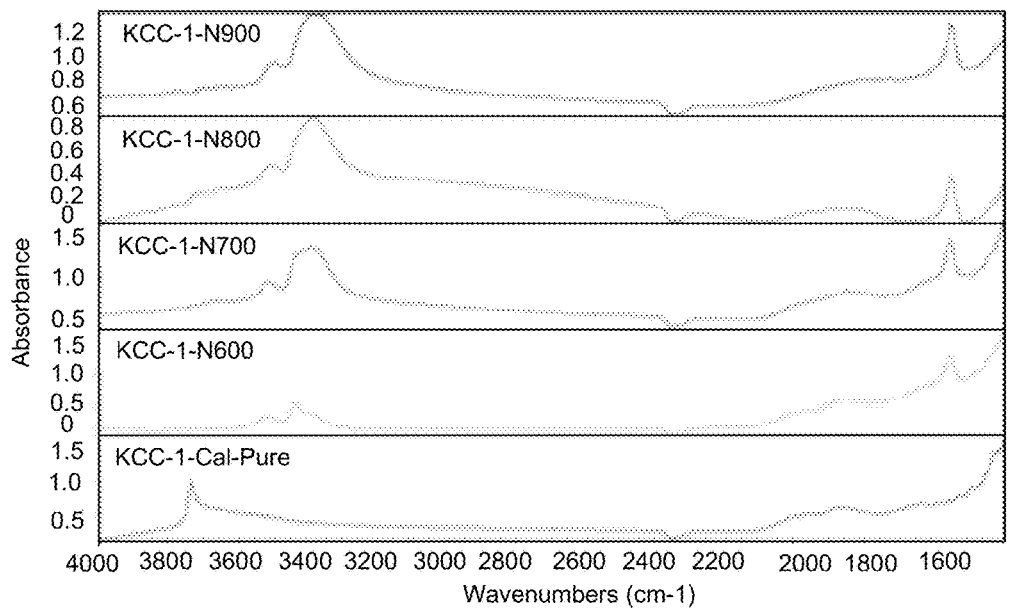
FIG. 3.6

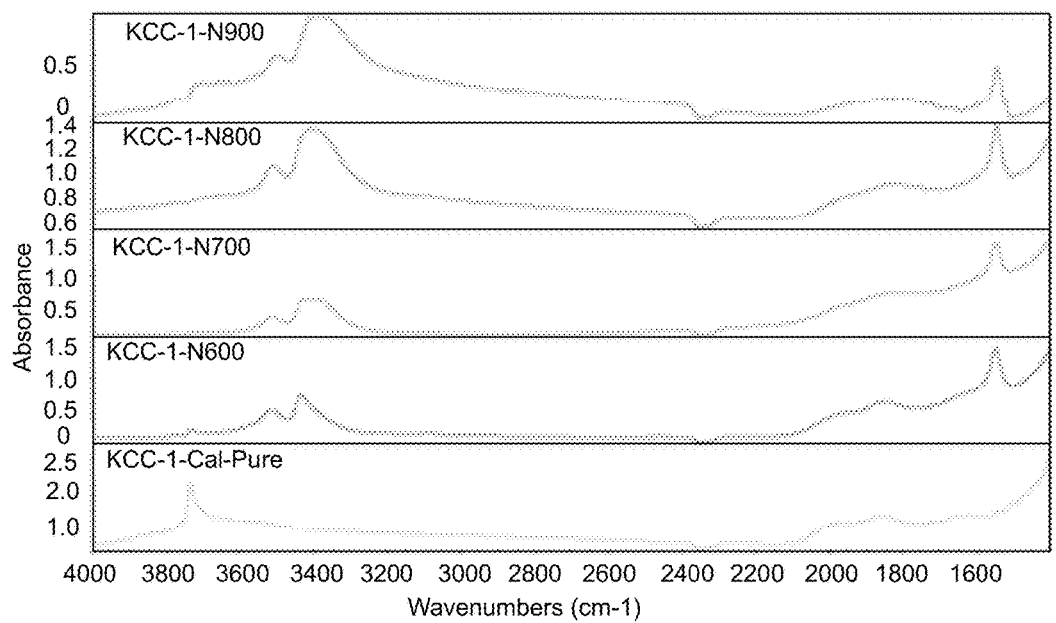
FIG. 3.7
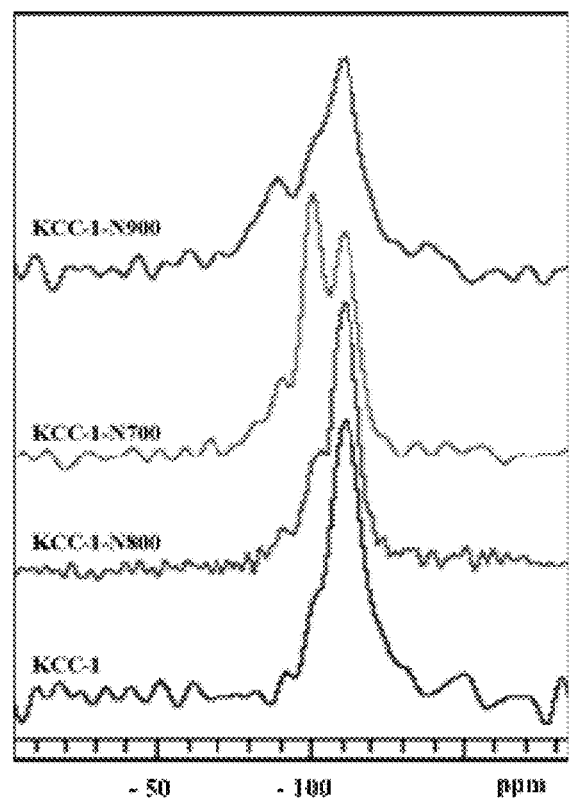
FIG. 3.8

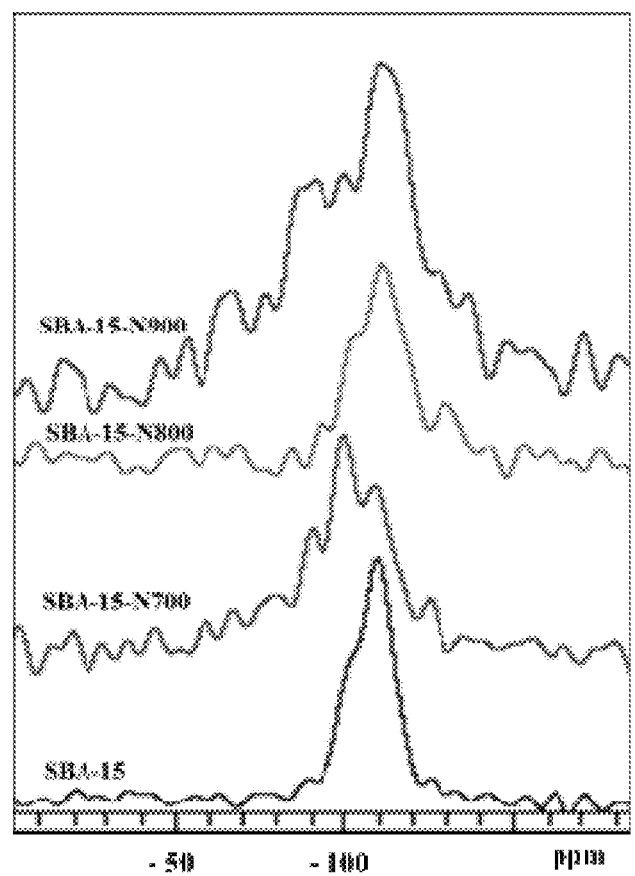
FIG. 3.9

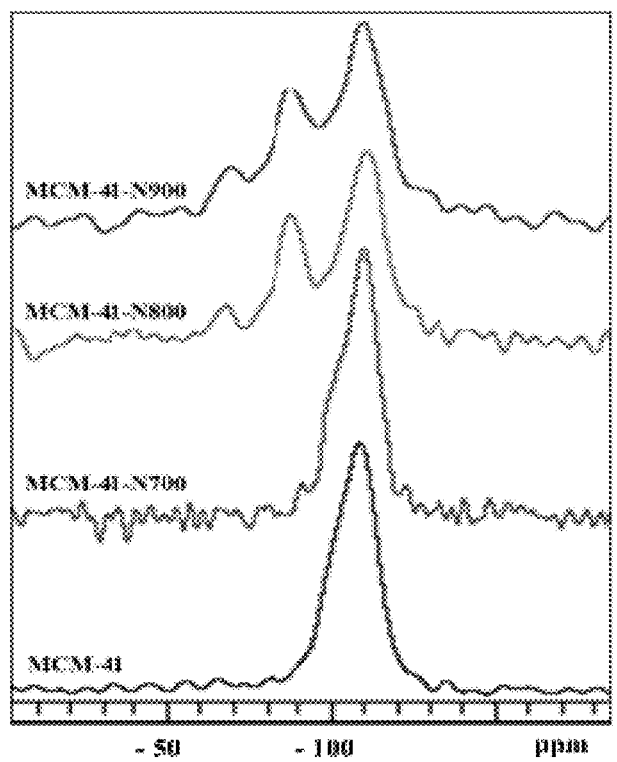
FIG. 3.10
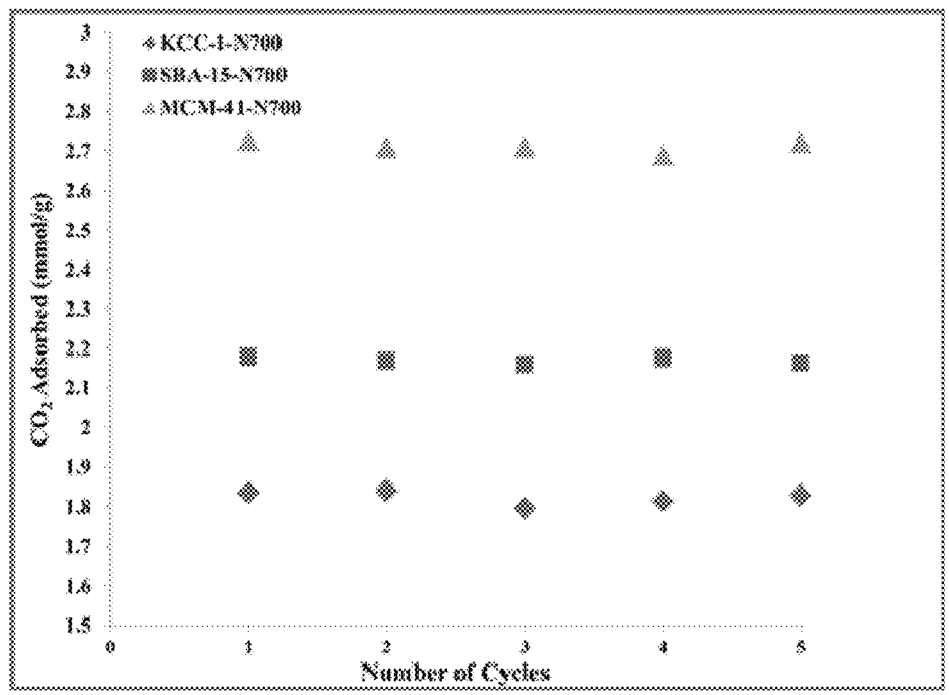
FIG. 3.11

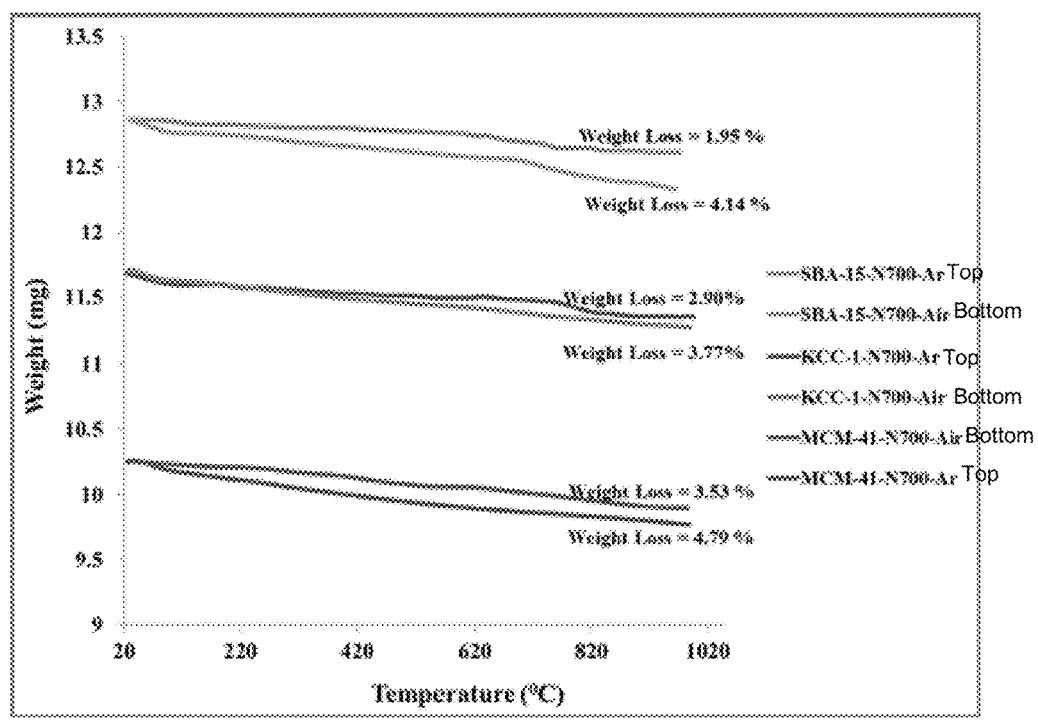
FIG. 3.12

MATERIALS FOR GAS CAPTURE, METHODS OF MAKING MATERIALS FOR GAS CAPTURE, AND METHODS OF CAPTURING GAS

CLAIM OF PRIORITY TO RELATED APPLICATION

This application is a divisional of co-pending U.S. non-provisional application entitled "MATERIALS FOR GAS CAPTURE, METHODS OF MAKING MATERIALS FOR GAS CAPTURE, AND METHODS OF CAPTURING GAS" having Ser. No. 13/709,155, filed on Dec. 10, 2012, and claims priority to U.S. provisional application entitled "MATERIALS FOR GAS CAPTURE, METHODS OF MAKING MATERIALS FOR GAS CAPTURE, AND METHODS OF CAPTURING GAS" having Ser. No. 61/576,416, filed on Dec. 16, 2011, which is entirely incorporated herein by reference.

BACKGROUND

Due to the increasing dependence on fossil fuels to meet our energy needs during the last few decades, the release of the greenhouse gas $CO_2$ has increased exponentially. Approximately 33 billion tons of carbon in the form of $CO_2$ was emitted into the atmosphere in 2010, and this trend is increasing every year. Due to rapid development worldwide, the energy demand is increasing. Unfortunately, there will be no significant change in the coming years in terms of the source of this energy, and fossil fuel will remain the major source for fulfilling this energy requirement.

Therefore, there are extensive efforts underway to develop technologies that will allow fossil fuel to be used with reduced $CO_2$ emissions. $CO_2$ capture and sequestration using solid adsorbents have received extensive interest due to their good sorption capacity, stability, ease of handling and reusability. A wide range of materials, such as amine-functionalized silica, oxides, zeolites, carbon, polymers and, recently, metal organic frameworks (MOFs), have been used. Among these materials, organic amino-functionalized silica has shown promise in fulfilling the desired working capture capacity. Although functionalization with organic amino moieties such as (3-aminopropyl)triethoxysilane (APTES) can result in high amine loadings onto the support material, the longevity of this type of material appears to be limited due to leaching of the organics from the support. Other disadvantages include the structural degradation of the support upon grafting and a drastic decrease in textural properties (surface area, pore volume and pore size). Additionally, the grafting processes are not clean and green because they require the use of expensive chemicals (such as APTES) or toxic solvents (e.g., toluene) and require multi-step operations (extractions, filtration, washing, and drying). More critically, their thermal stability is a major concern. Degradation of the amines from solid supports can reduce the capture capacity, restrict the regeneration and reusability and produce toxic volatile molecules. Therefore, there is a need o overcome these serious issues.

SUMMARY

In accordance with the purpose(s) of the present disclosure, as embodied and broadly described herein, embodiments of the present disclosure, in one aspect, relate to materials that can be used for gas (e.g., $CO_2$) capture, methods of making materials, methods of capturing gas (e.g., $CO_2$), and the like, and the like.

In an embodiment, a method of removing $CO_2$, among others, includes: providing an ammonolyated/nitridated material; and exposing the ammonolyated/nitridated material to $CO_2$, wherein at least a portion of the $CO_2$ is captured by the ammonolyated/nitridated material.

In an embodiment, a structure, among others, includes: an ammonolyated/nitridated material having the characteristic of capturing $CO_2$.

In an embodiment, a method of making ammonolyated/nitridated material, among others, includes: providing a material; dehydroxylating the material; and exposing the material to ammonia at a temperature of about −273 K to 2000 K or more to form an ammonolyated/nitridated material.

In an embodiment, a method of removing elements, among others, includes: providing an ammonolyated/nitridated material; and exposing the ammonolyated/nitridated material to a matrix that includes the elements, wherein at least a portion of these elements is captured/removed by the ammonolyated/nitridated material.

In an embodiment, a method of removing organic molecules, among others, includes: providing an ammonolyated/nitridated material; and exposing the ammonolyated/nitridated material to a matrix that includes the molecules, wherein at least a portion of these elements is captured/removed by the ammonolyated/nitridated material.

Other structures, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1.1 illustrates a general overview of the ammoniation of silica, as a function of reaction temperature.

FIG. 1.2 illustrates cyclic chlorination and ammoniation of silica.

FIG. 2.1 illustrates Scheme 1, which is a representative synthesis of KCC1-$NH_2$, MCM41-$NH_2$, and SBA15-$NH_2$.

FIGS. 2.2A, 2.2B, and 2.2C illustrate nitrogen isotherms for KCC-1, SBA-15, and MCM-41.

FIGS. 2.3A, 2.3B, and 2.3C illustrates $CO_2$ adsorption isotherms for KCC-1, SBA-15, and MCM-41.

FIG. 2.4 illustrates the adsorption of $CO_2$ on nitridated KCC-1 and SBA-15.

FIG. 2.5 illustrates a graph of the effect of nitridation temperature on KCC-1, SBA-15, and MCM-41.

FIG. 2.6 illustrates a graph of the thermal stability of KCC-1 (bottom line) and SBA-15 (top line).

FIG. 3.1 illustrates graphs of the $CO_2$ adsorption on calcined and nitrided (3.1a) KCC-1, (3.1c) SBA-15, and (3.1e) MCM-41 at 25° C.; Rate of adsorption of $CO_2$ on (3.1b) KCC-1-N700, (3.1d) SBA-15-N700, and (3.1f) MCM-41-N700 at 25° C.

FIG. 3.2 illustrates graphs of the $CO_2$ adsorption at 25° C. and 50° C. on (3.2a) KCC-1-N700, (3.2b) SBA-15-N700, (3.2c) MCM-41-N700; and isosteric heats of adsorption of (3.2d) KCC-1-N700, (3.2e) SBA-15-N700, and (3.2f) MCM-41-N700 at different $CO_2$ loading.

FIG. 3.3 illustrates TEM images of (3.3a) KCC-1, (3.3b) KCC-1-N700, (3.3c) KCC-1-N700-R, (3.3d) SBA-15, (3.3e) SBAC-15-N700, (3.3f) SBA-15-N700-R, (3.3g) MCM-41, (3.3h) MCM-41-N700, and (3.3i) MCM-41-N700-R.

FIG. 3.4 illustrates XRD patterns of (3.4a) SBA-15 nitrided materials (3.4c) MCM-41 nitrided materials and (3.4e) KCC-1 nitrided materials; adsorption-desorption isotherms of $N_2$ on (3.4b) SBA-15 nitrided materials, (3.4d) MCM-41 nitrided materials, and (3.4f) KCC-1 nitrided materials.

FIG. 3.5 illustrates IR spectra of KCC-1 Series of materials.

FIG. 3.6 illustrates IR spectra of MCM-41 Series of materials.

FIG. 3.7 illustrates $^{29}$Si-MAS-NMR of KCC-1 Series of materials.

FIG. 3.8 illustrates $^{29}$Si-MAS-NMR of SBA-15 Series of materials.

FIG. 3.9 illustrates $^{29}$Si-MAS-NMR of MCM-41 Series of materials.

FIG. 3.10 illustrates the regeneration and reuse of sorbents: KCC-1-N700, SBA-15-N700 and MCM-41-N700.

FIG. 3.11 illustrates the thermal gravimetric analysis of sorbents in air and in argon.

FIG. 3.12 illustrates the thermal stability of the synthesized nitrided materials.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

DISCUSSION

Embodiments of the present disclosure provide for materials that can be used for gas (e.g., $CO_2$) capture, methods of making materials, methods of capturing gas (e.g., $CO_2$), and the like. An advantage of an embodiment of the present disclosure is that the materials (also referred to as "functionalized particles or materials" or "ammonolyated/nitridated material") show excellent $CO_2$ capture (e.g., absorption or adsorption) capability while also being stable (e.g., thermally stable). In addition, an advantage of an embodiment of the present disclosure is that the particles can be regenerated and reused several times. Furthermore, an advantage of an embodiment of the present disclosure is that the method for making the materials is not complex.

In an embodiment, the ammonolyated/nitridated material can be an ammonolyated/nitridated silica material, an ammonolyated/nitridated metal oxide material, or an ammonolyated/nitridated non-metal oxide material. FIG. 1.2 provides an exemplary example of ammonolyated/nitridated silica material.

In an embodiment, the ammonolyated/nitridated material can have the characteristic of capturing one or more gases (e.g., $CO_2$, $H_2S$, alkane, olefin, hydrogen, oxygen, ammonia, CO, acid gases, inert gases, and a combination thereof). In addition, the ammonolyated/nitridated material can be used to capture or remove metals or elements in any oxidation state (e.g., heavy metal, light metal, and metal such as copper, copper compounds, palladium, palladium compounds, gold, gold compounds, cadmium, cadmium compounds, arsenic, actinium, thorium, uranium, radium, arsenic, arsenic compounds, arsine, barium, soluble compounds, sulfate, beryllium, beryllium compounds, boron, borates, boron halides, cadmium, salts, chromium, chromium compounds, germanium tetrahydride, indium, indium compounds, iron salts, soluble iron compounds, lead, lead salts, lead organo compounds, manganese compounds, mercury metal, mercury compounds, mercury organo compounds, molybdenum compounds, nickel compounds, osmium compounds, osmium tetroxide, rhodium compounds, selenium compounds, silver compounds, soluble silver compounds, tellurium compounds, thallium compounds, soluble thallium compounds, tin compounds, inorganic and organic tin compounds, tungsten compounds, tungsten compounds soluble, uranium compounds, yttrium metal, yttrium compounds, zinc, zinc compounds, chromates, oxide dust, zirconium compounds, and a combination thereof), or organic molecules (e.g., aldehyde, ketone, alcohols, alkanes, alkenes, amine, acid, base, and a combination thereof). Furthermore, the ammonolyated/nitridated material can be used as a catalyst support.

In an embodiment, the ammonolyated/nitridated material can have dimensions of about 1 nm to 1,000,000 cm, and any increment there between. In an example, the ammonolyated/nitridated material can have any shape (e.g., spherical) and when the ammonolyated/nitridated material has a spherical shape, it can have a diameter in the range noted above.

In an embodiment, the ammonolyated/nitridated material can have a porous structure, a non-porous structure, an amorphous structure, or a crystalline structure.

In general, the porous structure has a larger surface area than a non-porous structure of similar dimensions. In an embodiment, the porous structure can include a plurality of pores that can extend into the particle in random and/or defined channels. In an embodiment, one or more of the pores can extend through the materials. In an embodiment, the ammonolysis reaction can occur on the surface of the materials as well as within the pores so that amine groups are formed on the materials and within the channels.

In an embodiment, the nitridated silica silanol groups of parent materials (KCC-1, SBA-15 and MCM-41), was replaced by amine groups.

In an embodiment, the concentration of amine groups varies from about 0.1% to 70%, about 10 to 70%, about 30 to 70%, or about 50 to 70%, depending on temperature of nitridation.

In an embodiment, the surface area and other structural properties can be altered by adjusting the temperature of the nitridation.

As mentioned above, the ammonolyated/nitridated material can be an ammonolyated/nitridated silica material. In an embodiment, the silica material can be precipitated silica, fumes silica, fused silica, silica aerogel, silicates, hydrophobic or hydrophilic silica, silica from the MCM family, silica from the SBA family, silica from the KCC family, and their composites with other materials like metal or non-metal oxides. In a particular, embodiment, the silica can be purchased and has the trade names of KCC-1, MCM, and SBA. In an embodiment, the ammonolyated/nitridated silica material has a plurality of silicon-amine groups and/or silicon-oxynitride groups.

The KCC family is discussed in patent application PCT/US10/48004 (HIGH SURFACE AREA FIBROUS SILICA NANOPARTICLES), which is incorporated herein by reference. The KCC family is related to a new family of well-ordered nanoparticles with a particularly high surface area. The high surface area is due to the fibrous morphology of the nanoparticles. The nanoparticles show excellent physical properties, including a high surface area and a fibrous surface morphology, which makes it possible to obtain a high concentration of highly dispersed and easily accessible moieties on the surface of the nanoparticle. The nanoparticles also possess a high thermal stability and a high mechanical stability, rendering them suitable for a wide variety of applications in industry.

The KCC family generally includes nanoparticles that have a plurality of fibers, wherein each fiber is in contact with at least one other fiber. The term "nanoparticle" as used herein refers to a particle having a maximum diameter of between 1 and 5000 nm. "Plurality" as used herein refers to three or more. A "fiber" as used herein refers to a slender, threadlike structure that includes a length and a maximal thickness. Thickness can vary along the length of the fiber or it can be uniform along the length of the fiber. Different fibers can be of variable thickness or can be of uniform thickness. Similarly, fibers can be of variable length or can be of uniform length. In some embodiments, fibers are of varying lengths and varying thicknesses. In other embodiments, the fibers of a single nanoparticle are of uniform thickness and length.

In particular embodiments, the nanoparticle includes silica (silicon dioxide), titania, alumina, ceria, zirconia, or a mixture thereof.

In an embodiment, the fibers of a single nanoparticle may be of a length of about 1, 10, 50, 100, 500, or 1000 nm to about 2000, 2500, 3000, 3500, 4000, or 5000 nm, including all values and ranges there between. In particular embodiments, each fiber has a length of about 1, 10, 50, 100, or 500 nm to about 500, 600, 700, 800, 900 or 1000 nm, including all values and ranges there between. In more particular embodiments, each fiber has a length of about 1 nm to about 500 nm. The maximum thickness of a particular fiber can range from about 1 nm to about 100 nm. In more particular embodiments, the maximum thickness of a particular fiber can be about 1 nm to about 50 nm, about 1 nm to about 10 nm, or about 4 nm to about 10 nm. In some embodiments, each fiber has a length of about 1 nm to about 1000 nm and a thickness of about 1 nm to about 50 nm. In further embodiments, each fiber of a single nanoparticle has a length of about 1 nm to about 250 nm, and a thickness of about 1 nm to about 10 nm.

The number of fibers of a nanoparticle can vary. In some embodiments, the nanoparticle includes at least about 100 fibers, at least about 1000 fibers, at least about 10,000 fibers, at least about 100,000 fibers, or at least about 1,000,000 fibers or more, or any range of number of fibers derivable therein (e.g., about 100 to 1,000,000 fibers, 100,00 to 1,000,000 fibers, and the like).

In some embodiments, the nanoparticle has a configuration that is substantially spherical (herein referred to as a "nanosphere"). In such embodiments, the nanoparticle includes fibers that are substantially radially oriented within the nanosphere (i.e., converging to a central region of the nanoparticle). In such embodiments, the length of a fiber is the distance from the peripheral end of the fiber to the point the fiber attaches to another nanofiber in the central region of the nanosphere and is thus approximately equal to the radius of the nanosphere. In particular embodiments, the nanoparticle is a nanosphere comprised of silica that includes at least 100 fibers, where each fiber has a length of about 1 nm and about 250 nm and each fiber has a thickness of about 1 nm and about 10 nm.

In particular embodiments, as discussed above, the fibers are composed of silica. In further embodiments, the silica fibers include one or more attached ligands. A "ligand" as used herein refers to an ion, a molecule, a compound, a macromolecule, or a molecular group that is in contact with the fiber. In an embodiment, the contact may be direct contact, such as through a covalent bond or an ionic bond. For example, the ligand may be covalently attached to an oxygen atom of silica. Alternatively, the contact may be indirect, such as through an intervening molecule, such as a linker. The ligand may be attached by simple absorption or adsorption. In certain aspects, an intervening molecule is in contact with the ligand and the fiber. Non-limiting examples of linkers include an alkyl, a hydride, a carbene, a carbyne, a cyclopentadienyl, an alkoxide, an amido, or an imido group. The contact may be by simple absorption or adsorption of moieties onto the fibrous surface, admixed into the substance of the fibers, or inside the fibrous surface.

Non-limiting examples of ligands include metal catalytic molecules and organic molecules. "Metal catalytic molecule" as used herein refers to a metal ion, a metal oxide, any of various organometallic complexes or any molecule to which a metal ion or metal oxide is bound. Non-limiting examples of metals include Au, Pt, Pd, Ag, Ni, Ru, Rh, Ir, Os, Co, Mo, W, Re, Mn, In, Ga, Cd, Cr, Zr, Ta, Fe, and Cu. Non-limiting examples of metal oxides include various metal oxides of the above metals, $Al_2O_3$, $TiO_2$, $Fe_2O_3$, $CeO_2$, $CuO$, $ZnO$, $SiO_2$, $V_2O_5$, $MgO$, $La_2O_3$, $ZrO_2$, $SnO_2$, $MnO_2$, $MoO_3$, $Mo_2O_5$, and zeolites.

In some embodiments, the nanoparticle has a diameter of about 20, 30, 40, 50, 60, 70.80, 90, 100, 200, 300, 400, or 500 nm to about 1000, 1500, 2000, 25000, 3000, 3500, 4000, 4500 or 5000 nm, including all values and ranges there between. In further embodiments, the nanoparticle has a diameter of about 100 nm to about 750 nm. In still further embodiments, the nanoparticle has a diameter of about 250 nm to about 500 nm.

In particular embodiments, the nanoparticle is a nanosphere comprised of a plurality of fibers having a thickness of about 1 nm to about 10 nm and a length of about 25 nm to about 250 nm, where the nanoparticle is composed of silica and has a diameter of about 50 nm to about 500 nm. In a more particular embodiment, the nanosphere has a diameter of about 250 nm to about 450 nm.

As mentioned above, the ammonolyated/nitridated material can be an ammonolyated/nitridated metal oxide material. In an embodiment, the metal oxide material can include the oxide of a metal such as Au, Pt, Pd, Ag, Ni, Ru, Rh, Ir, Os, Co, Fe, Cu, as well as combinations of one or more of these. In an embodiment, the ammonolyated/nitridated metal oxide material has a plurality of metal oxide-amine groups and/or oxynitide groups.

As mentioned above, the ammonolyated/nitridated material can be an ammonolyated/nitridated non-metal oxide material. In an embodiment, the ammonolyated/nitridated non-metal oxide material has a plurality of non-metal oxide-amine groups and/or oxynitide groups.

The following illustrates some exemplary ways in which the amine and/or oxynitide groups are attached to the material, in this case Si, but is not limited to, Si. Nitridation (ammoniation) of silica base materials:

Surface Chemistry:

Highly dispersed silica dehydroxylated above temperature 723K is able to react with $NH_3$ forming $NH_2$ groups. Formation of the type and concentration of nitrogen containing species such as $SiN_3O$, $Si-NH_2$, $Si-NH$, and $SiN_3$ is highly dependent on reaction temperature.

Adsorption of ammonia on silica and formation of Si—$NH_2$ can occur by two possible mechanisms:

A) At moderate temperature: (<673K)

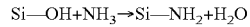

B) High temperature (up to 773K)

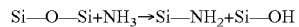

At temperature above 873K the formation of silazane (Si—NH—Si) species is favored with following possible mechanisms:

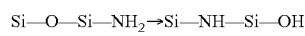

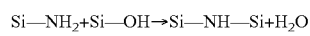

Under very high temperature of up to 1473K result in formation of silicon-oxynitride ($Si_2N_2O$) with residual silica.

The effect of reaction temperature on ammoniation of silica is shown in FIG. 1.1. It can be seen that for all regions an overlap of effect can be observed: at almost every reaction temperature, a mixture of several surface species are observed.

Alternative Approach:

Due to the difficulties encountered in direct ammoniation, a pre-activation of the silica surface method is can be used, prior to the ammoniation. This preactivation usually includes a replacement of the surface hydroxyls groups by more reactive groups. $CCl_4$, $SOCl_2$, chlorosilanes, $B_2H_6$ or $BCl_3$, can do this. In these cases, the uptake of ammonia is enhanced typically with a factor 10.

Reaction of Ammonia with Unmodified Silica Surface:

1) At moderate temperatures

Ammonia chemisorption only occurs at reaction temperatures above 673 K, and proceeds according to two reaction mechanisms. The main reaction (A) is a substitution reaction:

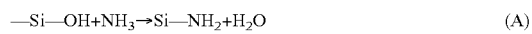 (A)

Second possible mechanism is dissociative reaction with siloxane bridges

 (B)

This reaction only occurs at relatively high (+773 K) pretreatment and reaction temperatures.

2) At high temperatures

At higher temperature, the formation of silazane species is promoted probably due to a secondary reaction of the Si—$NH_2$ species with (strained) siloxane bridges, according to reaction (C)

3) At very high temperatures

The final product of this directs nitridation method is silicon-oxynitride ($Si_2N_2O$) with residual silica. The nitridation is not restricted to the surface, but the N diffuses also into the bulk structure of the silica. No adequate mechanisms were presented yet to explain the observed reactions.

Chlorination of Silica Surfaces:

The reaction between silica and halogenating reagents permits the direct replacement of hydroxyl groups with halogen atoms, yielding reactive ≡Si—X surface groups.

Reaction with $SOCl_2$

One of the most common methods for the preparation of ≡Si—Cl groups is the treatment of the silica with thionyl chloride. In order to achieve a maximum conversion, the reaction is preferably carried out at temperatures above the boiling point of SOCl$_2$. After reaction, the physisorbed gases have to be removed by heating the product at 473 K under vacuum

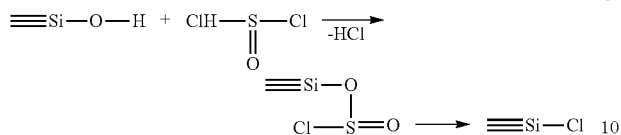

Reaction with CCl$_4$

Complete chlorination of the surface hydroxyl groups can also be achieved by treatment with CCl$_4$. The reaction is believed to proceed according to mechanism 2≡Si—OH+CCl$_4$→2≡Si—Cl+CO$_2$+H$_2$O Ammoniation of the Chlorinated Silica Surface:

Ammoniation of chlorinated surface takes place by thorough following reaction

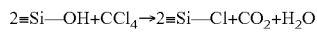

Ammoniation with Trichlorosilane:

The ammoniation of chlorosilylated silica is exemplified for the case of trichlorosilylated silica.

Ammoniation at Room Temperature:

When the silica gel is treated with trichlorosilane, prior to the ammoniation, the ammonia uptake capacity is enhanced with a factor 5-10. This enhancement is effective in the entire reaction temperature region. The room temperature ammoniation of chlorinated silica surfaces is completed within 5 minutes. Obviously, all ammoniation reactions occur in the gaseous phase.

Following is a possible reaction mechanism for this reaction:

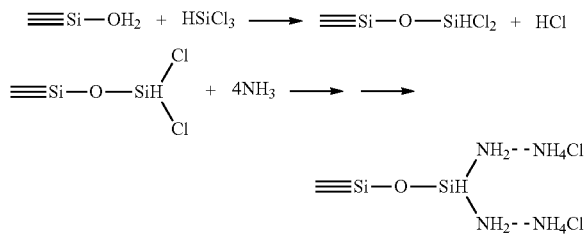

Ammoniation at Higher Temperatures

When the reaction temperature is raised above 423 K, the reaction mechanism becomes more complex: NH$_4$Cl sublimes from the surface and the amine function get gradually convert towards silazane and nitride species.

Cyclic chlorination and ammoniation of silica as shown in FIG. 1.2:

This reaction will densfy the NH$_2$ group o silica surface Cycle 1: Dehydroxilation of silica followed by Chlorination (with CCl$_4$, HSiCl$_3$, SOCl$_2$, etc) and ammonia adsorption. Cycle 2: Subjecting the ammoniated trichlorosilylated silica sample to another trichlorosilylation at room temperature followed by ammoniation Embodiments of the present disclosure also include methods of making ammonolyated/nitridated material. Initially, the material (e.g., silica, metal oxide, and the like) is dehydroxylated or used without dehydroxylation. In an embodiment, the dehydroxylating can be conducted by heating the material to a sufficient temperature to remove the water (e.g., from 100 to 1500K or more). In an embodiment, the temperature in the dehydroxylating step can increase at a rate of 1° C./min to 1° C./h and can be held at the desired temperature for about 0.1 h to 100 hours. Next the material is exposed to ammonia at a temperature of about −273 K to 2000 K or more to form an ammonolyated/nitridated material. In an embodiment, the temperature of the ammonolysis step can increase at a rate of 1° C./min to 1° C./h and can be held at the desired temperature for about 0.1 to 1000 hours. In an embodiment, the temperature of the ammonolysis step can be controlled to select the type of groups (e.g., amine, oxynitride, and the like) formed on the material. Additional details are provided in the Example section.

As noted above, the ammonolyated/nitridated material can be used to capture a gas such as CO$_2$. In an embodiment, the method includes exposing the ammonolyated/nitridated material to CO$_2$, where a portion of the CO$_2$ is captured by the ammonolyated/nitridated material. In an embodiment, the ammonolyated/nitridated material can be used in a filter or other structure to capture CO$_2$. In an embodiment, the ammonolyated/nitridated material can be used in a system (e.g., engine system, fuel cell system, various industries and the like) that generates CO$_2$, so that the ammonolyated/nitridated material can capture the generated CO$_2$. As noted above, a different gas or a combination of gases can be captured.

EXAMPLE

Example 1

Due to dependence of our energy needs on fossil fuels, during last few decades the release of greenhouse gas CO$_2$ has increased exponentially. About 7963 million tons of carbon as CO$_2$ was emitted in year 2009 to the atmosphere by burning of fossil fuel globally[1] and this trend is increasing every year. Due to rapid development world-wide, energy demand is increasing and unfortunately, there will be no significant change in coming years in terms of source of this energy and fossil fuel will be the major source of this energy need. Other non-conventional energy sources like, solar, nuclear or biofuel cannot replace fossil fuel at current stage.[2]

Therefore, there are extensive efforts going on to develop technologies that will allow us to use fossil fuel, but will reduce CO$_2$ emission. CO$_2$ capture and sequestration showed promising results and to achieve this solid absorbents have received extensive interest, due to their stability, ease of handling and reusability.[3-13] A wide range of materials, such as including amine functionalized silica,[3-13, 15-21] oxides,[3-13, 22-23] zeolites,[3-13, 24-25] carbon,[3-13] polymer[3-13] and recently metal organic framework (MOFs)[12, 26-29] have been used. Among them, amine functionalized silica and polymers have shown promise to meet the desired working capture capacity 3-4 mmmol/g.[13]

Although grafting amine functionality on these surfaces is a good option to reach working capture capacity, their thermal stability is a problem.[30-33] Degradation of the amines for solid supports can reduce its capture capacity, restrict its regeneration-reusability and can also produce toxic volatile molecules. To overcome this serious problems, development of new sorbent with enhanced stability is an urgent need.

In a continuation of our quest for sustainable protocols using morphologically controlled functionalized nanomaterials,[34-38] herein, we report use of ammonolyated/nitridated material as novel absorbent for CO$_2$ capture. Three series of functionalized materials (based on KCC-1, silica aerogel, fumes silica, MCM-family, IBN-family, and SBA-family), with silicon-amine (Si—$NH_2$, Si—NH, Si—N) group were prepared via ammonolysis using ammonia gas and showed excellent $CO_2$ capture capability. To the best of our knowledge, use of these materials is unprecedented and has never been reported before in the history of $CO_2$ absorbent materials.[2-33]

The first step to demonstrate this concept was to functionalize KCC-1, silica aerogel, fumed silica, IBN-7, MCM-41 and SBA-15 with amino groups. Functionalization was achieved by their post-synthetic modification using ammonolysis, under flow of ammonia gas at various temperatures (Scheme 1 in FIG. 2.1).

Synthesis of KCC-1, SBA-15 and MCM-41:

KCC-1,[35] SBA-15[39] and MCM-41[40] were synthesized as per previously reported procedures through template mediated hydrolysis-polycondensation of tetraethyl orthosilcate (TEOS).

In the case of KCC-1, TEOS (2.5 g) was dissolved in a solution of cyclohexane (30 mL) and pentanol (1.5 mL). A stirred solution of cetylpyridinium bromide (CPB) (0.5 g) and urea (0.6 g) in water (30 mL) was then added. This mixture was stirred for 30 min at room temperature, and was then exposed to microwave energy at 120° C. for 2.5 h. The product formed was washed with water and air-dried for 12 h. This material is designated as KCC-1.

In the case of SBA-15, tri-block poly(ethylene oxide)-poly(propylene oxide)-poly(ethylene oxide) [$(EO)_{20}(PO)_{70}(EO)_{20}$] (4 g) was dissolved in water (30 mL) and hydrochloric acid (2M, 120 mL) and then stirred for 30 min at 40° C. TEOS (9.15 mL) was then added to this and solution is further stirred at for 24 h. This mixture was then autoclaved at 100° C. for 24 h. The product formed was washed with water and dried at 80° C. 24 h. This material is designated as SBA-15.

In the case of MCM-41, cetyltetrabutyl ammonium bromide (CTAB) (8.8 g) was dissolved in a mixture of water (208 mL) and aqueous ammonia (96 mL, 30%) at 35° C. To this solution, TEOS (40 mL) was slowly added while stirring and stirring was continued for 3 h. The gel formed was aged in a closed container at room temperature for 24 h. The product obtained was washed with water and air-dried. This material is designated as MCM-41.

Removal of Template:

The amino functional density/loading on the surface of silica can depend on the density of surface silanols. That means, the higher the silanol density, the better the amine loading and greater the $CO_2$ capture capacity.[4] Therefore we use two different methods to remove the template molecules.

The first method uses calcination in air; the above synthesized materials (KCC-1, SBA-15 and MCM-41) were placed in a quartz tube and then heated at 550° C. for 6 h in the continuous flow of air. The materials obtained were designated as KCC-1$_{Cal}$, SBA-15$_{Cal}$, MCM-41$_{Cal}$.

The second method uses solvent extraction; the above synthesized materials (KCC-1, SBA-15 and MCM-41) were taken in a round bottom flask and refluxed in ethanol for 8 h. The material was then filtered and re-dispersed in fresh ethanol and again refluxed for another 8 h. The obtained material was then dried and was designated as KCC-1$_{Sol}$, SBA-15$_{Sol}$, MCM-41$_{Sol}$.

Amino-Functionalization:

Amino-functionalization of these materials was achieved via thermal ammonolysis using flow of ammonia gas.[42-50]

Typically, ammonolysis was carried out by loading 50 mg to 50 gm of material (KCC-1$_{Cal}$, SBA-15$_{Cal}$, MCM-41$_{Cal}$, SBA-15$_{Sol}$, MCM-41$_{Sol}$) on an aluminum boat or in a dynamic plug flow reactor, housed in a tube furnace. First, the pretreatment was performed at 773 K for 1-4 h in $N_2$ or argon flow to remove adsorbed water on the silica surface. Then, the furnace temperature was then further increased to required temperatures (in the range from −273 K to 2000K) (5 K/min), and was maintained for 1-50 h under an $NH_3$ atmosphere. The furnace was then cooled down to room temperature in $N_2$ or argon flow.

Nitrogen Isotherms:

Nitrogen isotherms for the materials corresponding to the materials in the Table below are shown FIGS. 2.2A, 2.2B, and 2.2C.

Degassing Condition-Temperature: 350° C., Heating rate: 10° C./min, Time: 240 min

| Sample Name | Surface Area ($m^2/g$) | |
|---|---|---|
| | Before Nitridation | After Nitridation |
| KCC-1 | 473.72 | 394.31 |
| SBA-15 | 775.81 | 520.91 |
| MCM-41 | 995.83 | 905.94 |

$CO_2$ Adsorption Isotherm:

$CO_2$ adsorption isotherms for KCC-1, SBA-15, and MCM-41 are shown in FIGS. 2.3A, 2.3B, and 2.3C. (Nitridation Conditions: Temp: 1173K, $NH_3$ flow rate: 300 mL/min, Time: 10 hr)

$CO_2$ Adsorption Isotherm:

(Nitridation Conditions: Temp: 773K, $NH_3$ flow rate: 300 mL/min, Time: 10 hr) Figure: 2.4 Adsorption of $CO_2$ on Nitridated KCC-1 and SBA-15.

The Curves in the FIGS. 3.1 are the $CO_2$ adsorption isotherm on the nitridated KCC-1 and SBA-15. They belong to type II isotherm. Such isotherm type is originated in the different adsorption mechanism of gases commonly seen in activated charcoal. $CO_2$ is condensable and multilayer adsorption or condensation in micro or mesopores might take place. This isotherm is a sign of multi-layer adsorption.

It can be firmly concluded from above graph that nitridation temperature plays a key role in amount of $CO_2$ capture. (DATA for MCM-41 not yet available at 773K). This effect can be attributed to formation of various ammonia species at different temperature on surface of silica. More detailed study at various different temperatures, ramp time, hold time, ammonia flow, is under progress and will be added in later stage, as soon as completed.

Thermal Stability of Nitridated KCC-1 and SBA-15:

These material found stable up to 1000° C., indicated their excellent regeneration-reuse capability, for $CO_2$ capture. A regeneration and recybabality of all prepared materials for $CO_2$ capture is underway and preliminary experiments shows promising results.

References, each of which is incorporated by reference:
1. Calculated by Earth Policy Institute from G. Marland, T. A. Boden, and R. J. Andres, "Global, Regional, and National CO2 Emissions," Trends: A Compendium of Data on Global Change (Oak Ridge, Tenn.: Carbon Dioxide Information Analysis Center, 2010); BP, Statistical Review of World Energy (London: 2010). Note-Data exclude cement production and gas flaring emissions.
2. Needs, resources and climate change: Clean and efficient conversion technologies. Ahmed F. Ghoniem, Progress in Energy and Combustion Science 37 (2011) 15-51.
3. Recent Advances in CO2 Capture and Utilization. Kai Man Kerry Yu, Igor Curcic, Joseph Gabriel, and Shik Chi Edman Tsang, ChemSusChem 2008, 1, 893-899.

4. Adsorbent Materials for Carbon Dioxide Capture from Large Anthropogenic Point Sources. Sunho Choi, Jeffrey H. Drese, and Christopher W. Jones, ChemSusChem 2009, 2, 796-854.
5. Carbon Dioxide Capture: Prospects for New Materials. Deanna M. D'Alessandro, Berend Smit, and Jeffrey R. Long, Angew. Chem. Int. Ed. 2010, 49, 6058-6082.
6. E. J. Maginn, "What to Do with CO2?", Invited Guest Commentary, Journal of Physical Chemistry Letters, 2010, 1, 3478-3479.
7. Generation, Capture, and Utilization of Industrial Carbon Dioxide. Andrew J. Hunt, Emily H. K. Sin, Ray Marriott, and James H. Clark, ChemSusChem 2010, 3, 306-322.
8. $CO_2$ capture by solid adsorbents and their applications: current status and new trends. Qiang Wang, Jizhong Luo, Ziyi Zhong and Armando Borgna, Energy Environ. Sci., 2011, 4, 42-55.
9. An overview of CO2 capture technologies. Niall MacDowell, Nick Florin, Antoine Buchard, Jason Hallett, Amparo Galindo, George Jackson, Claire S. Adjiman, Charlotte K. Williams, Nilay Shah and Paul Fennell, Energy Environ. Sci., 2010, 3, 1645-1669.
10. Why hybrid porous solids capture greenhouse gases? Gerard Ferey, Christian Serre, Thomas Devic, Guillaume Maurin, Herve Jobic, Philip L. Llewellyn, Guy De Weireld, Alexandre Vimont, Marco Daturi and Jong-San Chang, Chem. Soc. Rev., 2011, 40, 550-562.
11. Novel porous solids for carbon dioxide capture. Guang-Ping Hao, Wen-Cui Li and An-Hui Lu, J. Mater. Chem., 2011, 21, 6447.
12. Carbon dioxide capture-related gas adsorption and separation in metal-organic frameworks. Jian-Rong Li, Yuguang Ma, M. Colin McCarthy, Julian Sculley, Jiamei Yu, Hae-Kwon Jeong, Perla B. Balbuena, Hong-Cai Zhou, Coordination Chemistry Reviews 255 (2011) 1791-1823.
13. Post-Combustion CO2 Capture Using Solid Sorbents: A Review. Arunkumar Samanta, An Zhao, George K. H. Shimizu, Partha Sarkar, and Rajender Gupta, Ind. Eng. Chem. Res. 2011, doi: 10.1021/ie200686q.
14. High efficiency nanocomposite sorbents for CO2 capture based on amine-functionalized mesoporous capsules. Genggeng Qi, Yanbing Wang, Luis Estevez, Xiaonan Duan, Nkechi Anako, Ah-Hyung Alissa Park, Wen Li, Christopher W. Jonesc and Emmanuel P. Giannelis, Energy Environ. Sci., 2011, 4, 444-452.
15. Amine-Grafted MCM-48 and Silica Xerogel as Superior Sorbents for Acidic Gas Removal from Natural Gas. Huang, Helen Y.; Yang, Ralph T.; Chinn, Daniel; Munson, Curtis L. Industrial & Engineering Chemistry Research (2003), 42(12), 2427-2433
16. Novel Polyethylenimine-Modified Mesoporous Molecular Sieve of MCM-41 Type as High-Capacity Adsorbent for CO2 Capture. Xu, Xiaochun; Song, Chunshan; Andresen, John M.; Miller, Bruce G.; Scaroni, Alan W. Energy & Fuels (2002), 16(6), 1463-1469.
17. Adsorption characteristics of carbon dioxide on organically functionalized SBA-15. Hiyoshi, Norihito; Yogo, Katsunori; Yashima, Tatsuaki, Microporous and Mesoporous Materials (2005), 84(1-3), 357-365
18. Diethylenetriamine[propyl(silyl)]-Functionalized (DT) Mesoporous Silicas as CO2 Adsorbents. Knowles, Gregory P.; Delaney, Seamus W.; Chaffee, Alan L. Industrial & Engineering Chemistry Research (2006), 45(8), 2626-2633.
19. Designing Adsorbents for CO2 Capture from Flue Gas—Hyperbranched Aminosilicas Capable of Capturing CO2 Reversibly. Hicks, Jason C.; Drese, Jeffrey H.; Fauth, Daniel J.; Gray, McMahan L.; Qi, Genggeng; Jones, Christopher W. Journal of the American Chemical Society (2008), 130(10), 2902-2903
20. Synthesis-Structure-Property Relationships for Hyperbranched Aminosilica CO2 Adsorbents. Drese, Jeffrey H.; Choi, Sunho; Lively, Ryan P.; Koros, William J.; Fauth, Daniel J.; Gray, McMahan L.; Jones, Christopher W. Advanced Functional Materials (2009), 19(23), 3821-3832.
21. New Insights into the Interactions of CO2 with Amine-Functionalized Silica. Serna-Guerrero, Rodrigo; Da'na, Enshirah; Sayari, Abdelhamid, Industrial & Engineering Chemistry Research (2008), 47(23), 9406-9412
22. Recent advances in capture of carbon dioxide using alkali-metal-based oxides. Shengping Wang, Suli Yan, Xinbin Ma and Jinlong Gong, Energy Environ. Sci., 2011, 4, 3805.
23. Facile Synthesis of Ordered Mesoporous Alumina and Alumina-Supported Metal Oxides with Tailored Adsorption and Framework Properties. Cai, Weiquan; Yu, Jiaguo; Anand, Chokkalingam; Vinu, Ajayan; Jaroniec, Mietek, Chemistry of Materials (2011), 23(5), 1147-1157
24. Adsorption of CO2 on Zeolites at Moderate Temperatures. Siriwardane, Ranjani V.; Shen, Ming-Shing; Fisher, Edward P.; Losch, James, Energy & Fuels (2005), 19(3), 1153-1159
25. Enhancement of the CO2 Retention Capacity of Y Zeolites by Na and Cs Treatments: Effect of Adsorption Temperature and Water Treatment. Diaz, Eva; Munoz, Emilio; Vega, Aurelio; Ordonez, Salvador, Industrial & Engineering Chemistry Research (2008), 47(2), 412-418
26. Can Metal-Organic Framework Materials Play a Useful Role in Large-Scale Carbon Dioxide Separations? Keskin, Seda; van Heest, Timothy M.; Sholl, David S. ChemSusChem (2010), 3(8), 879-891
27. Metal-Organic Frameworks with Exceptionally High Capacity for Storage of Carbon Dioxide at Room Temperature. Millward, Andrew R.; Yaghi, Omar M. Journal of the American Chemical Society (2005), 127(51), 17998-17999.
28. An Isoreticular Series of Metal-Organic Frameworks with Dendritic Hexacarboxylate Ligands and Exceptionally High Gas-Uptake Capacity. Yuan, Daqiang; Zhao, Dan; Sun, Daofeng; Zhou, Hong-Cai, Angewandte Chemie, International Edition (2010), 49(31), 5357-5361,
29. Understanding Inflections and Steps in Carbon Dioxide Adsorption Isotherms in Metal-Organic Frameworks. Walton, Krista S.; Millward, Andrew R.; Dubbeldam, David; Frost, Houston; Low, John J.; Yaghi, Omar M.; Snurr, Randall Q. Journal of the American Chemical Society (2008), 130(2), 406-407
30. Stabilization of Amine-Containing CO2 Adsorbents: Dramatic Effect of Water Vapor. Sayari, Abdelhamid; Belmabkhout, Youssef, Journal of the American Chemical Society (2010), 132(18), 6312-6314
31. Degradation of amine-supported CO2 adsorbents in the presence of oxygen-containing gases, Aliakbar Heydari-Gorji, Youssef Belmabkhout, Abdelhamid Sayari, Microporous and Mesoporous Materials 145 (2011) 146-149.
32. New Amines for CO2 Capture. III. Effect of Alkyl Chain Length between Amine Functions on Polyamines Degradation. Helene Lepaumier, Sandrine Martin, Dominique Picq, Bruno Delfort, and Pierre-Louis Carrette, Ind. Eng. Chem. Res. 2010, 49, 4553-4560.

33. Oxidative Degradation of Aminosilica Adsorbents Relevant to Postcombustion CO2 Capture. Praveen Bollini, Sunho Choi, Jeffrey H. Drese, and Christopher W. Jones, Energy Fuels 2011, 25, 2416-2425.
34. "Hydro-metathesis" of Olefins: A New Catalytic Reaction with a Bifunctional Single-Site Catalyst Ta-H/KCC-1. Vivek Polshettiwar, J. Thivolle-Cazat, Mostafa Taoufik, Francois Stoffelbach, Sebastien Norsic, J. M. Basset, Angew. Chem. Int. Ed. 2011, 50, 2747-2751.
35. High Surface Area Silica Nanospheres (KCC-1) with Fibrous Morphology. Vivek Polshettiwar, D. Cha, X. Zhang and J. M. Basset, Angew. Chem. Int. Ed. 2010, 49, 9652-9656.
36. Self-assembly of metal oxides into 3D nano-structures: Synthesis and nano-catalysis. Vivek Polshettiwar, Babita Baruwati, and R. S. Varma, ACS Nano 2009, 3, 728-736.
37. Magnetically Recoverable Nano-Catalysts. Vivek Polshettiwar, Rafael Luque, Aziz Fihri, Haibo Zhu, M. Bouhrara, Jean Marie Basset, Chem. Rev. 2011, 111, 3036-3075.
38. Synthesis of single-crystal micro-pine structured nano-ferrites and their application in catalysis. Vivek Polshettiwar, M. N. Nadaguada and R. S. Varma, Chem. Commun. 2008, 6318-6320.
39. Nonionic Triblock and Star Diblock Copolymer and Oligomeric Surfactant Syntheses of Highly Ordered, Hydrothermally Stable, Mesoporous Silica Structures. D. Zhao, Q. Huo, J. Feng, B. F. Chmelka and G. D. Stucky. J. Am. Chem. Soc., 120 (1998), p. 6024-6036.
40. A comparative study of the functionalization of mesoporous silica MCM-41 by deposition of 3-aminopropyltrimethoxysilane from toluene and from the vapor phase. H. Ritter, M. Nieminen, M. Karppinen and D. Brühwiler, Microporous Mesoporous Mater., 121 (2009), pp. 79-83.)
41. Increasing Selective CO2 Adsorption on Amine-Grafted SBA-15 by Increasing Silanol Density. Lifeng Wang and Ralph T. Yang, J. Phys. Chem. C 2011, 115, 21264-21272.
42. Thermal nitridation of silicon dioxide films. F. H. P. M. Habraken, A. E. T. Kuiper, and Y. Tamminga, J. B. Theeten, J. Appl. Phys. 1982, 53, 6996-7002.
43. Ordered Mesoporous Silicon Oxynitride. Jamal El Haskouri, Sa, 1 Cabrera, Fernando Sapiæa, Julio Latorre, Carmen Guillem, Aurelio Beltrµn-Porter, Daniel Beltrµn-Porter, M. Dolores Marcos, and Pedro Amorós, Adv. Mater. 2001, 13, 192-195.
44. Pore size engineering of mesoporous silicon nitride materials. Stefan Kaskel, Klaus Schlichte and Bodo Zibrowius, Phys. Chem. Chem. Phys., 2002, 4, 1675-1681.
45. Highly Ordered Mesoporous Silicon Oxynitride Materials as Base Catalysts. Yongde Xia and Robert Mokaya. Angew. Chem. Int. Ed. 2003, 42, 2639-2644.
46. Novel Route to Periodic Mesoporous Aminosilicas, PMAs: Ammonolysis of Periodic Mesoporous Organosilicas. Tewodros Asefa, Michal Kruk, Neil Coombs, Hiltrud Grondey, Mark J. MacLachlan, Mietek Jaroniec, and Geoffrey A. Ozin, J. AM. CHEM. SOC. 2003, 125, 11662-11673.
47. Structural change and characterization in nitrogen-incorporated SBA15 oxynitride mesoporous materials via different thermal history. Jiacheng Wang, Qian Liu, Microporous and Mesoporous Materials 83 (2005) 225-232.
48. Nitridation mechanism of mesoporous silica: SBA-15. Naotaka Chino, Tatsuya Okubo, Microporous and Mesoporous Materials 87 (2005) 15-22.
49. Effect of Pore Structure on the Nitridation of Mesoporous Silica with Ammonia. Fumitaka Hayashi, Ken-ichi Ishizu, and Masakazu I, Eur. J. Inorg. Chem. 2010, 2235-2243.
50. Fast and Almost Complete Nitridation of Mesoporous Silica MCM-41 with Ammonia in a Plug-Flow Reactor. Fumitaka Hayashi, Ken-ichi Ishizu, and Masakazu Iwamoto, J. Am. Ceram. Soc., 93 [1] 104-110 (2010).

Example 2

Brief Introduction:

We report the use of silicon oxynitrides as novel adsorbents for $CO_2$ capture. Three series of functionalized materials based on KCC-1, SBA-15 and MCM-41 with Si—$NH_2$ groups were prepared using a simple one-step process via thermal ammonolysis using ammonia gas, and they demonstrated excellent $CO_2$ capture capabilities. These materials overcome several limitations of conventional amine-grafted mesoporous silica. They offer good $CO_2$ capture capacity, faster adsorption-desorption kinetics, efficient regeneration and reuse, more crucially excellent thermal and mechanical stability even in oxidative environments, and a clean and green synthesis route, which allows the overall $CO_2$ capture process to be practical and sustainable.

Introduction:

Due to the increasing dependence on fossil fuels to meet our energy needs during the last few decades, the release of the greenhouse gas $CO_2$ has increased exponentially. Approximately 33 billion tons of carbon in the form of $CO_2$ was emitted into the atmosphere in 2010,[1] and this trend is increasing every year. Due to rapid development worldwide, the energy demand is increasing. Unfortunately, there will be no significant change in the coming years in terms of the source of this energy, and fossil fuel will remain the major source for fulfilling this energy requirement.

Therefore, there are extensive efforts underway to develop technologies that will allow fossil fuel to be used with reduced $CO_2$ emissions. $CO_2$ capture and sequestration using solid adsorbents have received extensive interest due to their good sorption capacity, stability, ease of handling and reusability.[2-6] A wide range of materials, such as amine-functionalized silica,[2,3] oxides,[2,4] zeolites,[2,5] carbon,[2] polymers[2] and, recently, metal organic frameworks (MOFs),[6] have been used. Among these materials, organic amino-functionalized silica has shown promise in fulfilling the desired working capture capacity.[2k] Although functionalization with organic amino moieties such as (3-aminopropyl) triethoxysilane (APTES) can result in high amine loadings onto the support material, the longevity of this type of material appears to be limited due to leaching of the organics from the support. Other disadvantages include the structural degradation of the support upon grafting and a drastic decrease in textural properties (surface area, pore volume and pore size). Additionally, the grafting processes are not clean and green because they require the use of expensive chemicals (such as APTES) or toxic solvents (e.g., toluene) and require multistep operations (extractions, filtration, washing, and drying). More critically, their thermal stability is a major concern.[2,7] Degradation of the amines from solid supports can reduce the capture capacity, restrict the regeneration and reusability and produce toxic volatile molecules. To overcome these serious issues, the development of a new, robust sorbent with enhanced stability is urgently necessary.

In continuation with our objective to develop sustainable protocols using morphologically controlled functionalized nanomaterials,[8] herein, we report the use of silicon oxynitrides as novel adsorbents for $CO_2$ capture. Three series of functionalized materials (based on KCC-1, SBA-15 and MCM-41) with Si—$NH_2$ groups were prepared using a simple, one-step, thermal ammonolysis process, and these materials showed excellent $CO_2$ capture capabilities.

These materials overcome several limitations of conventional amine-grafted mesoporous silica, including sustainable synthesis protocol, a good $CO_2$ capture capability, fast kinetics, and advantages in terms of both chemisorption and physisorption. More importantly, they exhibit excellent thermal stability and regenerability and a low sorbent cost. The first step in accomplishing these adsorbent designs was to functionalize KCC-1,[8d] SBA-15[9] and MCM-41[10] with amino groups. Functionalization was achieved by postsynthetic modification using ammonolysis[11] under a flow of ammonia ($NH_3$) gas at various temperatures (FIG. 2.1).

Results and Discussion:

Evaluation of As-Synthesized Sorbent Materials for $CO_2$ Capture:

To assess the performance of these nitrided silica materials, we evaluated them on the basis of six critical factors important for any material being considered as a sustainable $CO_2$ sorbent[2k]: 1) Capture capacity, 2) Kinetics of adsorption, 3) Regeneration and reuse, 4) Mechanical strength, 5) Thermal stability and 6) Sorbent cost. $CO_2$-Capture Capacity:

The $CO_2$-adsorption capacity of a sorbent material is of principal importance for the sustainability and practicality of the capture process. The capacity determines the economics of the $CO_2$ capture plant, including the amount of adsorbent material required and the size and volume of the adsorber vessels. As-synthesized materials were probed for $CO_2$ capture using a volumetric method. The sample cell was loaded with approximately 150 mg of as-synthesized materials, and after the adsorbent was outgassed in a vacuum at 350° C. for 4 h to remove any adsorbed impurities, the adsorption run was performed using highly pure $CO_2$ between 0 to 1 atmospheric pressure at 25° C.

To optimize the nitridation temperature for the maximum $CO_2$ capture capacity, a wide range of nitrided KCC-1, SBA-15 and MCM-41 materials were prepared by conducting ammonolysis at different temperatures (Table 1, the nitrided samples were named KCC-1-N, SBA-15-N and MCM-41-N followed by the nitridation temperature.). As can be clearly perceived from the data in Table 1, temperature plays a key role in the extent of nitridation and consequently in the nitrogen content and the textural properties of the materials. The nitrogen content increased linearly with the reaction temperature.

TABLE 1

Physicochemical properties, nitrogen content and $CO_2$ adsorption capacity of calcined and nitrided materials.

| Sample ID | BET Surface Area ($m^2 g^{-1}$) | BJH Pore Volumes ($cm^3 g^{-1}$) | Nitrogen Content (weight %) | $CO_2$ Adsorption Capacity (mmol $g^{-1}$) |
|---|---|---|---|---|
| KCC-1 | 473 | 0.83 | 0.02 | 0.56 |
| KCC-1-N400 | 468 | 0.78 | 0.56 | 0.38 |
| KCC-1-N500 | 443 | 0.71 | 1.42 | 0.71 |
| KCC-1-N600 | 435 | 0.68 | 1.82 | 1.26 |
| KCC-1-N700 | 418 | 0.65 | 6.8 | 1.86 |
| KCC-1-N800 | 407 | 0.52 | 12.75 | 1.53 |
| KCC-1-N900 | 394 | 0.45 | 21.05 | 1.41 |
| SBA-15 | 775 | 1.17 | 0.01 | 0.76 |
| SBA-15-N400 | 761 | 1.14 | 0.12 | 0.88 |
| SBA-15-N500 | 754 | 1.10 | 0.65 | 1.28 |
| SBA-15-N600 | 746 | 1.08 | 1.74 | 1.93 |
| SBA-15-N700 | 728 | 1.05 | 7.89 | 2.22 |
| SBA-15-N800 | 668 | 0.91 | 14.16 | 2.02 |
| SBA-15-N900 | 520 | 0.85 | 24.17 | 2.12 |
| MCM-41 | 995 | 1.27 | Not detected | 1.25 |
| MCM-41-N400 | 960 | 1.25 | 0.05 | 1.12 |
| MCM-41-N500 | 948 | 1.10 | 0.70 | 1.70 |
| MCM-41-N600 | 941 | 0.94 | 1.64 | 2.20 |
| MCM-41-N700 | 935 | 0.87 | 8.38 | 2.72 |
| MCM-41-N800 | 921 | 0.68 | 13.67 | 2.18 |
| MCM-41-N900 | 905 | 0.53 | 22.45 | 2.29 |

The density of amino functionality (FIGS. 3.5-3.7) on the surface of silica is largely depends on the density of surface silanols. That means, more the silanols density, better will be the amine loading and greater will be the $CO_2$ capture capacity. Recently, Yang et al have reported,[12] increased surface silanol density on solvent extracted SBA-15 to be beneficial for higher amine loading and subsequently the $CO_2$ adsorption capacity. However, in our study nitridation of solvent extracted samples have shown considerably lower $CO_2$ capture capacity compare to their calcined analogous (Table 3), probably due to incomplete removal of template.

The adsorption isotherms of $CO_2$ on nitrided KCC-1, SBA-15 and MCM-41 materials are plotted in FIG. 3.1. It was observed that the adsorbed amount of $CO_2$ on the calcined silica (before nitridation) as a function of pressure exhibits a linear relationship in the entire pressure range, which clearly indicates physisorption. However, the isotherms of $CO_2$ on the nitrided silica sorbents are type-I (FIG. 3.1a, c, e), with a slope in the low-pressure range, which indicates chemisorption with strong interactions between $CO_2$ molecules and amino groups. It is also clear that the adsorbed amount of $CO_2$ on the nitrided silica is much higher than the amount on the calcined silica before nitridation (Table 1). Therefore, the behavior of these materials in carbon dioxide adsorption may be primarily attributed to the change in their chemical surface properties, particularly in the density of the surface amino functionality. Modifying the silica surface with a high-temperature ammonia treatment appears to be a suitable approach to enhance chemisorption without cancelling the contribution of physisorption. The maximum $CO_2$ capture capacity of the KCC-1 nitrided series was 1.86 mmol $g^{-1}$ (FIG. 3.1a). Similarly, the maximum capture capacities for the SBA-15 and MCM-41 nitrided series were 2.22 mmol $g^{-1}$ (FIG. 3.1c) and 2.72 mmol $g^{-1}$ (FIG. 3.1e), respectively. These values are close to the working capture capacity.[2]

The $CO_2$ capture capacity increases linearly with nitridation temperature from 300 to 700° C. for all three nitrided series (FIGS. 3.1a, c, e). However, the materials that were nitrided at 800° C. and 900° C. exhibited reduced capture capacity (Table 1). Although nitrogen content of these material increased with the nitridation temperature (Table 1), but this is not reflected in an enhancement of the $CO_2$ adsorption capacity. This indicates that the type of surface nitrogen species on nitrided silica is highly temperature dependent. It is reported that ammonolysis of the silanol groups of silica occurs above 400° C. and proceeds via two different pathways.[11,j] The main pathway is a substitution reaction; —Si—OH+NH$_3$→Si—NH$_2$+H$_2$O. The key feature of this reaction mechanism is the fact that a certain type of proton mobility is induced in the surface silanols by the interaction with ammonia, which causes the H$_2$O leaving group to be subsequently replaced by NH$_3$. The rate-limiting step in this reaction is the formation and desorption of the water molecule. This mechanism could explain why we were able to achieve a much higher degree of nitridation in present study using a flow system compared with the results obtained using a static boat system.[11i] The second pathway, which can occur at temperatures greater than 500° C., involves dissociative reactions with siloxane silica bridges: —Si—O—Si—+NH$_3$→—Si—NH$_2$+—Si—OH. Notably, at temperatures greater than 700° C., the formation of silazane (—Si—NH—Si—) species is reported due to a secondary reaction of the —Si—NH$_2$ species with siloxane bridges: —Si—NH$_2$+—Si—OH→—Si—NH—Si—+H$_2$O. Thus, at higher temperatures, the surface amines are getting incorporated into the bulk matrix of the silica.[11j] This behavior was confirmed by $^{29}$Si-MAS-NMR spectroscopic analysis of the as-synthesized materials (FIGS. 3.8-3.10).

Kinetics of CO$_2$ Capture:

For a sorbent to be practically usable, it should adsorb and desorb CO$_2$ as fast as possible. To study the kinetics using a TGA analyzer, the nitrided materials were first heated up to 110° C. under a flow of 100 mL/min argon, held for 2 h, cooled down to 25° C., and maintained for 1 h at this temperature to stabilize the sample weight. The flow was then switched to 100 mL/min of CO$_2$ and maintained for 2 h to evaluate the CO$_2$ adsorption rate. The adsorption on optimized materials, i.e., KCC-1-N700 (FIG. 3.1b), SBA-15-N700 (FIG. 3.1d), and MCM-41-N700 (FIG. 3.1f), exhibits very fast kinetics with almost complete uptake of CO$_2$ within 0.5 to 2 min. Fast kinetics are possible because of the unaltered morphological features of these materials even after nitridation, which contributes to CO$_2$ physisorption, and the amino-functionalized surface contributes to chemisorption. Desorption was performed by heating the sample under argon to 110° C. (via a 10° C./min ramp), and was completed within 8-10 minutes for all the materials. Thus, the observed fast kinetics will have a shorter adsorption/desorption cycle time, and more CO$_2$ will be absorbed in a shorter amount of time, which will reduce the overall cost of the capture process.

To understand the interaction of CO$_2$ with amine groups, isosteric heats of adsorption on KCC-1-N700 (FIG. 3.2a, 3.2d), SBA-15-N700 (FIG. 3.2b, 3.2e), and MCM-41-N700 (FIG. 3.2c, 3.2f), were calculated from the CO$_2$ adsorption isotherms at 25 and 50° C. by using Clausis-Clapeyron equation. For all three materials, the heat of adsorption decreased gradually as the CO$_2$ amount loading was increased, which indicates moderate chemisorption strength of these oxynitride materials.

Regeneration and Reuse of Sorbents:

A good sorbent should desorb CO$_2$ easily at low temperatures and must retain its capture capacity during continual adsorption-desorption cycles. The regeneration-reuse capability of optimized nitrided materials (KCC-1-N700, SBA-15-N700 and MCM-41-N700) was studied by conducting a multicycle adsorption-desorption experiment. After the first cycle was completed, the material was regenerated by a thermal swing at 150° C. and was reused for another CO$_2$ sorption cycle. It was found that the synthesized sorbents could be used at least five times without any change in their capture capacity (FIG. 3.11). This ease of regeneration-reuse will help sustain the overall CO$_2$ capture process.

Mechanical Strength of Sorbents:

Excellent mechanical strength is a prerequisite for a sorbent to be practically viable. To evaluate the mechanical strength of our synthesized nitrided materials, we conducted transmission electron microscopy (TEM) (FIG. 3.3), X-ray diffraction (XRD) (FIG. 3.4a, c, e) and N$_2$-adsorption-desorption (FIG. 3.4b, d, f) analysis of calcined, nitrided and recycled samples (denoted by the suffix 'It' in the sample name). The morphology and structure of these materials was first studied by TEM. FIG. 3.2a indicates that the KCC-1 includes spheres of uniform size with diameters ranging from 250 to 450 nm with a unique fibrous morphology. This morphology remains intact even after nitridation and after five cycles of CO$_2$ capture (FIG. 3.3a, b, c). In the cases of SBA-15 (FIGS. 3.3d, e, f) and MCM-41 (FIGS. 3.3g, h, i), the structural ordering (ordered cylindrical pores open at both ends) of the materials is well preserved even after nitridation and after five regeneration-reuse cycles with no detectable changes in their mesoporous structures.

The small-angle XRD patterns of nitrided and recycled SBA-15, MCM-41 (FIGS. 3.4a and c respectively) showed three well-resolved peaks that can be indexed as (100), (110), and (200) because of their hexagonal symmetry. In the case of KCC-1-based sorbents, the diffraction patterns exhibited a broad hump (FIG. 3.4e) as opposed to sharp peaks for SBA-15 and MCM-41. This is due to the fibrous nature of KCC-1[8d] compared with the ordered mesoporous structures of SBA-15 and MCM-41. These results indicate that the structural changes resulting from the thermal treatment with ammonia do not occur at the expense of structural ordering.

The nitrogen sorption measurements were also performed (at −196° C.) to evaluate the change in the quality and structural ordering of our materials after nitridation and recycling. The nitrogen sorption isotherm of the KCC-1 series is typical of type IV (FIG. 3.4f). The BET surface area and the BJH pore volume of KCC-1-N700 were slightly reduced to 418 m$^2$ g$^{-1}$ (from 473 m$^2$ g$^{-1}$ of KCC-1) and 0.65 cm$^3$ g$^{-1}$ (from 0.83 cm$^3$ g$^{-1}$ of KCC-1), respectively. However, no significant changes in the surface area and pore volume of recycled KCC-1-N700-R were observed compared to KCC-1-N700 (Table 1). This clearly indicates the robust nature of KCC-1 (which is already known to be thermally stable even after heating in air up to 900° C.)[8d] and its nitrided version. A typical type IV isotherm with the hysteresis loop of type H1 with parallel adsorption and desorption branches, which are characteristic of capillary condensation and evaporation processes, was observed in the SBA-15 and MCM-41 and their nitrided and recycled versions (FIGS. 3.4b and d, respectively). The surface areas of SBA-15-N700 and MCM-41-N700 decreased to 728 m$^2$ g$^{-1}$ (from 775 m$^2$ g$^{-1}$ of SBA-15) and 935 m$^2$ g$^{-1}$ (from 995 m$^2$ g$^{-1}$ of MCM-41), respectively. However, no significant change in the surface area of their recycled version was observed when compared with their nitrided counterpart. There was a minor reduction in the pore volume after nitridation of both the SBA-15 and MCM-41 series, which remained unchanged in the recycled materials.

Some of the disadvantages of organic amine-grafted silica are the drastic decrease in textural properties that occur after grafting. Although such grafting introduces a high concentration of amino groups, they block the porous structure of the support, which reduces the surface area, pore volume and, more critically, the accessibility of free amino groups for CO$_2$ capture.[2] We have compared performance of our nitrided materials over conventional APTES-grafted materials. In case of nitrided materials, unlike organic amine-grafted silica, we did not observe significant changes in the morphology of the materials or any significant deterioration in surface area and pore volume (Table 2). This indicates the good mechanical strength of these materials and the excellent accessibility of surface amino groups, which will help the $CO_2$ capture process to be sustainable.

TABLE 2

Comparison of organic amine-grafted silica and nitrided silica.

| Properties | KCC1-N700 | KCC1-APTES | SBA15-N700 | SBA15-APTES | MCM41-N700 | MCM41-APTES |
|---|---|---|---|---|---|---|
| Surface Area ($m^2 g^{-1}$) | 418 | 106 | 728 | 294 | 935 | 14 |
| Pore Volume ($cm^3 g^{-1}$) | 0.65 | 0.56 | 1.05 | 0.526 | 0.87 | 0.03 |
| $N_2$ Contents (%) | 6.8 | 4.65 | 7.89 | 9.1 | 8.38 | 6.1 |
| $CO_2$ Capture (mmol $g^{-1}$) at 1 bar, 25° C. | 1.86 | 1.23 | 2.22 | 2.04 | 2.72 | 1.63 |
| % Wt. Loss up to 800° C. | 2.90 | 19.30 | 1.95 | 38 | 3.53 | 25 |

Thermal Stability of Sorbents:

Thermal stability is another very crucial factor determining the usefulness of a sorbent material. Although functionalization with organic amino moieties such as APTES can result in high amine loadings onto the support material, the lifetime of such materials is limited due to leaching or thermal degradation of the organics from the support.[2,7] To evaluate the thermal stability of our synthesized nitrided materials, we conducted a thermal gravimetric analysis under argon (Ar) and under air from room temperature to 1000° C. (FIG. 3.12). Weight losses of only 2.9, 1.95 and 3.53% (attributed to the loss of moisture and $CO_2$ adsorbed from the atmosphere) for KCC-1-N700, SBA-15-N700 and MCM-41-N700, respectively, were observed, which indicates the high thermal stability of these materials under an inert atmosphere. In an oxidative environment also, only minor weight losses of 3.73, 4.14, and 4.79% were observed respectively, which were due to the loss of moisture and $CO_2$ adsorbed from the atmosphere. This is probably the highest thermal stability for any amine-grafted silica material reported for $CO_2$ capture. However, it is important to note that these materials are not stable against hydrolysis.

Sorbent Cost:

The cost of the sorbent material is one of the most decisive factors. Our synthesis protocol is simple: treatment of silica with ammonia with no other chemical or complicated process. In the case of conventional organic amino-functionalized materials, expensive chemicals (such as APTES), toxic solvents and even multistep operations are required, which makes them very expensive and non-sustainable. However, use of the stabilizers/organic surfactants/organic solvents in the (pre)synthesis of inorganic support materials (KCC-1, MCM-41 and SBA-15) cannot be avoided in this process also, as these are essential to synthesis the porous supports. Therefore, as-synthesized nitrided materials involving a comparatively clean and green synthesis appear to be a viable alternative to existing sorbents.

Conclusions:

In summary, three series of amino-functionalized materials based on KCC-1, SBA-15 and MCM-41 were prepared via thermal ammonolysis and evaluated as sorbents for $CO_2$ capture. These materials appear to exhibit the following advantages over conventional amine-grafted silica: 1) good $CO_2$ capture capacity; 2) faster kinetics, which will have a shorter adsorption/desorption cycle time and cause more gas to be absorbed in a shorter amount of time; 3) easy regeneration and efficient reuse of sorbents; 4) excellent mechanical strength, which will help to sustain the overall $CO_2$ capture process; 5) high thermal stability in inert and oxidative environment, which will help these materials retain a good capture capacity even after several temperature swing regeneration cycles in an industrial environment; and 6) comparatively green material synthesis and less expensive production costs, which allows the overall process to be sustainable.

Supplemental Section:

Synthesis of KCC-1, SBA-15 and MCM-41:

KCC-1, SBA-15 and MCM-41 were synthesized following a previously reported procedure via the template-mediated hydrolysis-polycondensation of tetraethyl orthosilcate (TEOS). In the case of KCC-1, TEOS (2.5 g) was dissolved in a solution of cyclohexane (30 mL) and pentanol (1.5 mL). A stirred solution of cetylpyridinium bromide (CPB) (0.5 g) and urea (0.6 g) in water (30 mL) was then added. This mixture was stirred for 30 min at room temperature and was then exposed to microwaves at 120° C. for 2.5 h. The product was washed with water and air dried. The template was removed by calcination at 550° C. for 6 h in a continuous flow of air, and the obtained material is designated as KCC-1.

In the case of SBA-15, tri-block poly(ethylene oxide)-poly(propylene oxide)-poly(ethylene oxide) [$(EO)_{20}(PO)_{70}(EO)_{20}$] (4 g) was dissolved in a mixture of water (30 mL) and hydrochloric acid (2 M, 120 mL) and stirred for 30 min at 40° C. TEOS (9.15 mL) was then added, and the solution was further stirred for 24 h. This mixture was then autoclaved at 100° C. for 24 h. The product formed was washed with water and dried at 80° C. for 24 h. The template was removed by calcination at 550° C. for 6 h in a continuous flow of air, and the obtained material is designated as SBA-15.

In the case of MCM-41, cetyltrimethyl ammonium bromide (CTAB) (8.8 g) was dissolved in a mixture of water (208 mL) and aqueous ammonia (96 mL, 35%) at 35° C. To this solution, TEOS (40 mL) was added slowly under stirring. After further stirring for 3 h, the gel formed was aged in a closed container at room temperature for 24 h. The product was washed with water and air dried. The template was removed by calcination at 550° C. for 6 h in a continuous flow of air, and the obtained material is designated as MCM-41.

Amino-Functionalization by Nitridation:

The amino-functionalization of these materials was achieved via thermal ammonolysis (nitridation) using a flow of ammonia gas. Nitridation was performed using a plug-flow fixed-bed metal reactor (inner diameter of 5 mm) placed vertically inside the tubular furnace. Typically, 200-

300 mg of material (KCC-1, SBA-15 or MCM-41) was loaded in the reactor with a 100 mL/min flow of argon, and the furnace was heated to 100° C. at a ramp rate of 5° C./min. The flow was changed to pure ammonia gas and held for 10 h at the desired temperature (400, 500, 600, 700, 800 or 900° C.). The furnace was cooled to 100° C., the gas flow was changed to 100 mL/min of argon, and the furnace was further cooled to room temperature. The nitrided samples were designated as KCC-1-N, SBA-15-N and MCM-41-N followed by the nitridation temperature.

Organic Amine Grafting:

Grafting of APTES was achieved by refluxing 0.5 g of calcined KCC-1, SBA-15 or MCM-41 with (3-aminopropyl) triethoxysilane (5 mL) in 50 mL of toluene for 24 h. The resulting material was washed repeatedly with toluene and then dried under vacuum at 60° C. for 12 h. The obtained samples were designated as KCC-1-APTES, SBA-15-APTES, MCM-41-APTES.

TABLE 3

Physicochemical properties, nitrogen contents and $CO_2$ adsorption capacity of solvent extracted-nitridated materials.

| Sample ID | BET Surface Area ($m^2 g^{-1}$) | Average Pore Diameter (nm) | BJH Pore Volumes ($cm^3 g^{-1}$) | Nitrogen Content (wt. %) | $CO_2$ Adsorption Capacity (mmol $g^{-1}$) |
|---|---|---|---|---|---|
| KCC-1-Series | | | | | |
| KCC-1-Sol | 397 | 7.31 | 0.78 | Not detected | 0.19 |
| KCC-1-Sol-N400 | 361 | 7.28 | 0.73 | 0.55 | 0.27 |
| KCC-1-Sol-N500 | 349 | 7.21 | 0.61 | 0.53 | 0.31 |
| KCC-1-Sol-N600 | 351 | 7.24 | 0.57 | 0.90 | 0.48 |
| KCC-1-Sol-N700 | 328 | 7.18 | 0.41 | 4.32 | 1.07 |
| KCC-1-Sol-N800 | 331 | 7.03 | 0.32 | 12.75 | 1.18 |
| KCC-1-Sol-N900 | 304 | 6.94 | 0.23 | 21.05 | 1.12 |
| SBA-15-Series | | | | | |
| SBA-15-Sol | 602 | 7.15 | 0.83 | 0.01 | 0.76 |
| SBA-15-Sol-N400 | 590 | 7.02 | 0.78 | 0.07 | 0.88 |
| SBA-15-Sol-N500 | 568 | 6.95 | 0.71 | 0.54 | 1.28 |
| SBA-15-Sol-N600 | 547 | 6.84 | 0.63 | 0.84 | 1.93 |
| SBA-15-Sol-N700 | 519 | 6.69 | 0.52 | 4.87 | 2.22 |
| SBA-15-Sol-N800 | 461 | 6.31 | 0.41 | 7.89 | 2.02 |
| SBA-15-Sol-N900 | 403 | 6.08 | 0.29 | 14.76 | 2.12 |
| MCM-41-Series | | | | | |
| MCM-41-Sol | 490 | 1.97 | 1.23 | 1.06 | 1.25 |
| MCM-41-Sol-N400 | 483 | 1.95 | 1.19 | 0.53 | 1.12 |
| MCM-41-Sol-N500 | 470 | 1.86 | 1.13 | 0.7 | 1.70 |
| MCM-41-Sol-N600 | 458 | 1.72 | 1.12 | 1.64 | 2.20 |
| MCM-41-Sol-N700 | 447 | 1.66 | 1.03 | 8.38 | 2.72 |
| MCM-41-Sol-N800 | 438 | 1.54 | 0.92 | 13.67 | 2.18 |
| MCM-41-Sol-N900 | 430 | 1.37 | 0.88 | 22.45 | 2.29 |

REFERENCES, EACH OF WHICH IS INCORPORATED HEREIN BY REFERENCE

1. J. G. J. Olivier, G. Janssens-Maenhout, J. A. H. W. Peters and J. Wilson, PBL Netherlands Environmental Assessment Agency, The Hague, European Union 2011.
2. a) K. M. K. Yu, I. Curcic, J. Gabriel and S. C. E. Tsang, ChemSusChem, 2008, 1, 893; b) S. Choi, J. H. Drese and C. W. Jones ChemSusChem, 2009, 2, 796; c) D. M. D'Alesandro, B. Smit and J. R. Long, Angew. Chem. Int. Ed. 2010, 49, 6058; d) E. Stavitski, E. A. Pidko, S. Couck, R. Remy, E. J. M. Hensen, B. Weckhuysen, J. Denayer, J. Gascon and F. Kapteijn, Langmuir, 2011, 27, 3970; e) A. J. Hunt, A. J. E. H. K. Sin, R. Marriott and J. H. Clark, ChemSusChem, 2010, 3, 306; f) Q. Wang, J. Luo, Z. Zhong and A. Borgna, Energy Environ. Sci. 2011, 4, 42; g) N. MacDowell, N. Florin, A. Buchard, J. Hallett, A. Galindo, G. Jackson, C. S. Adjiman, C. K. Williams, N. Shah and P. Fennell, Energy Environ. Sci., 2010, 3, 1645; h) G. Ferey, C. Serre, T. Devic, G. Maurin, H. Jobic, P. L. Llewellyn, G. D. Weireld, A. Vimont, M. Daturi and J. S. Chang, Chem. Soc. Rev. 2011, 40, 550; i) G. P. Hao, W. C. Li and A. H. Lu, J. Mater. Chem., 2011, 21, 6447; j) J. R. Li, Y. Ma, M. C. McCarthy, J. Sculley, J. Yu, H. K. Jeong, P. B. Balbuena and H. C. Zhou, Coord. Chem. Rev., 2011, 255, 1791; k) A. Samanta, A. Zhao, A. G. K. H. Shimizu, P. Sarkar and R. Gupta, Ind. Eng. Chem. Res., 2012, 51, 1438; l) W. Chaikittisilp, J. D. Lunn, D. F. Shantz, and C. W. Jones, Chem. Eur. J. 2011, 17, 10556; m) P. Markewitz, W. Kuckshinrichs, W. Leitner, J. Linssen, P. Zapp, R. Bongarts, A. Schreiber and T. E. Muller, Energy Environ. Sci., 2012, doi: 10.1039/C2EE03403D; n) H. Yang, A. M. Khan, Y. Yuan, S. C. Tsang, Chem. Asian J. 2012, 7, 498-502.
3. a) G. Qi, Y. Wang, L. Estevez, X. Duan, N. Anako, A. H. A. Park, W. Li, C. W. Jones and E. P. Giannelis, Energy Environ. Sci., 2011, 4, 444; b) H. Y. Huang, R. T. Yang, D. Chinn and C. L. Munson, Ind. Eng. Chem. Res., 2003, 43, 2427; c) X. Xiaochun, S. Chunshan, J. M. Andresen, B. G. Miller and A. W. Scaroni, Energy & Fuels, 2002, 16, 1463; d) N. Hiyoshi, K. Yogo and T. Yashima, Micro. Meso. Mater., 2005, 84, 357; e) G. P. Knowles, S. W. Delaney and A. L. Chaffee, Ind. Eng. Chem. Res., 2006, 45, 2626; f) J. C. Hicks, J. H. Drese, D. J. Fauth, M. L. Gray, G. Qi and C. W. Jones, J. Am. Chem. Soc., 2008, 130, 2902; g) J. H. Drese, S. Choi, R. P. Lively, W. J. Koros, D. J. Fauth, M. L. Gray and C. W. Jones, Adv. Funct. Mater., 2009, 19, 3821; h) R. Serna-Guerrero, E. Da'na and A. Sayari, Ind. Eng. Chem. Res., 2008, 47, 9406.

4. a) S. Wang, S. Yan, X. Ma and J. Gong, *J. Energy Environ. Sci.* 2011, 4, 3805; b) W. Cai, J. Yu, C. Anand, A. Vinu and M. Jaroniec, *Chem. Mat.,* 2011, 23, 1147.
5. a) R. V. Siriwardane, M. S. Shen, E. P. Fisher and J. Losch, *Energy & Fuels,* 2005, 19, 1153; b) E. Diaz, E. Munoz, A. Vega and S. Ordonez, *Ind. Eng. Chem. Res.,* 2008, 47, 412.
6. a) S. Keskin, T. M. Van Heest and D. S. Sholl, *ChemSusChem,* 2010, 3, 879; b) A. R. Millward and O. M. Yaghi, *J. Am. Chem. Soc.,* 2005, 127, 17998; c) D. Yuan, D. Zhao, D. Sun and H. C. Zhou, *Angew. Chem, Int. Ed.,* 2010, 48, 5357; d) K. S. Walton, A. R. Millward, D. Dubbeldam, H. Frost, J. J. Low, O. M. Yaghi and R. Q. Snurr, *J. Am. Chem. Soc.,* 2008, 130, 406.
7. a) A. Sayari and Y. Belmabkhout, *J. Am. Chem. Soc.,* 2010, 132, 6312; b) A. Heydari-Gorji, Y. Belmabkhout and A. Sayari, *Micro. Meso. Mater.,* 2011, 145, 146; c) H. Lepaumier, S. Martin, D. Picq, B. Delfort and P. Carrette, *Ind. Eng. Chem. Res.,* 2010, 49, 4553; d) P. Bollini, S. Choi, J. H. Drese and C. W. Jones, *Energy & Fuels,* 2011, 25, 2416.
8. a) V. Polshettiwar and U. Patil, US Patent Application no. 2011/61576416; b) A. Fihri, R. Sougrat, R. R. Baby, R. Rahal, D. Cha, M. Hedhili, M. Bouhrara, H. N. Alshareef and V. Polshettiwar, *ChemSusChem,* 2012, 5, doi: 10.1002/cssc.201100620; c) V. Polshettiwar, J. Thivolle-Cazat, M. Taoufik, F. Stoffelbach, S. Norsic and J. M. Basset, *Angew. Chem. Int. Ed.* 2011, 50, 2747; d) V. Polshettiwar, D. Cha, X. Zhang and J. M. Basset, *Angew. Chem. Int. Ed.,* 2010, 49, 9652; e) V. Polshettiwar, B. Baruwati and R. S. Varma, *ACS Nano,* 2009, 3, 728; e) V. Polshettiwar, R. Luque, A. Fihri, H. Zhu, M. Bouhrara and J. M. Basset, *Chem. Rev.,* 2011, 11, 3036; f) V. Polshettiwar, M. N. Nadaguada, R. S. Varma, *Chem. Commun.,* 2008, 47, 6318.
9. D. Zhao, Q. Huo, J. Feng, B. F. Chmelka and G. D. Stucky, *J. Am. Chem. Soc.,* 1998, 119, 6024.
10. H. Ritter, M. Nieminen, M. Karppinen and D. Brühwiler, *Micro. Meso. Mater.,* 2009, 121, 79.
11. a) F. H. P. Habraken, A. E. T. Kuiper, Y. Tamminga and J. B. J. Theeten, *Appl. Phys.,* 1982, 53, 6996; b) J. E. Haskouri, S. Cabrera, F. Sapina, J. Latorre, C. Guillem, A. Beltran-Porter, D. Beltran-Porter, M. D. Marcos and P. Amoros, *Adv. Mater.,* 2011, 13, 192; c) S. Kaskel, G. Schlichte and B. Zibrowius, *Phys. Chem. Chem. Phys.,* 2002, 4, 1675; d) Y. Xia and R. Mokaya, *Angew. Chem. Int. Ed.,* 2003, 42, 2639; e) T. Asefa, M. Kruk, N. Coombs, H. Grondey, M. J. MacLachlan, M. Jaroniec and G. A. Ozin, *J. Am. Chem. Soc.,* 2003, 125, 11662; f) J. Wang and Q. Liu, *Micro. Meso. Mater.,* 2005, 83, 225; g) N. Chino and T. Okubo, *Micro. Meso. Mater.,* 2005, 87, 15; h) F. Hayashi, K. Ishizu and I. Masakazu, *Eur. J. Inorg. Chem.,* 2010, 15, 2235; i) F. Hayashi, K. Ishizu and M. Iwamoto, *J. Am. Ceram. Soc.,* 2010, 93, 104; j) P. Fink, B. Muller and G. J. Rudakoff, *Non-Crystalline Sol.,* 1992, 145, 99.
12. L. Wang and R. T. Yang, *J. Phys. Chem. C,* 2011, 115, 21264.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'". When a range includes "zero" and is modified by "about" (e.g., about one to zero or about zero to one), about zero can include, 0, 0.1. 0.01, or 0.001.

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A method of removing $CO_2$, comprising:
   providing a nitridated silica material, wherein the nitridated silica material is formed using ammonia and has a plurality of silicon-amine groups; and
   exposing the nitridated silica material to $CO_2$, wherein at least a portion of the $CO_2$ is captured by the nitridated silica material.

2. The method of claim 1, wherein the nitridated silica material further comprises a nitridated metal oxide material, a nitridated non-metal oxide material, or a combination thereof.

3. The method of claim 2, wherein the nitridated metal oxide material has a plurality of metal oxide-amine groups.

4. The method of claim 2, wherein the nitridated non-metal oxide material has a plurality of non-metal oxide-amine groups.

5. The method of claim 1, wherein the nitridated material has a structure selected from the group consisting of: a porous structure, a non-porous structure, an amorphous structure, and a crystalline structure.

6. A method of removing $CO_2$, comprising:
   providing a nitridated material; and
   exposing the nitridated material to $CO_2$, wherein at least a portion of the $CO_2$ is captured by the nitridated material,
   wherein the nitridated material is formed through cyclic chlorination and ammoniation of a material to densify $NH_2$ groups on the material surface, wherein cyclic chlorination and ammoniation includes dehydroxilation of the material followed by chlorination with thionyl chloride and ammonia adsorption and subjecting the ammoniated trichlorosilylated material to another exposure to trichlorosilylation ammoniation to form a surface having a network of surface —Si(NH)$_2$—(NH)—Si—(HN$_2$)$_{2 \, or \, 3}$.

7. A method of removing $CO_2$, comprising:
   providing a nitridated silica material, wherein the nitridated silica material is an amino-functionalized material and comprises silica nanoparticles having a plurality of silicon-oxynitride groups; and
   exposing the nitridated silica material to $CO_2$, wherein at least a portion of the $CO_2$ is captured by the nitridated silica material.

8. A method of removing $CO_2$, comprising:
   providing a nitridated silica material, wherein the nitridated silica material comprises silica nanoparticles having a plurality of silicon-oxynitride groups, wherein the nitridated silica material further comprises fibrous silica nanoparticles; and exposing the nitridated silica material to $CO_2$, wherein at least a portion of the $CO_2$ is captured by the nitridated silica material.

9. The method of claim 7, wherein the nitridated silica material further comprises a nitridated metal oxide material, a nitridated non-metal oxide material, or a combination thereof.

10. The method of claim 9, wherein the nitridated metal oxide material has a plurality of metal oxide-amine groups.

11. The method of claim 9, wherein the nitridated non-metal oxide material has a plurality of non-metal oxide-amine groups.

12. A method of removing $CO_2$, comprising:
providing a mesoporous nitridated material, wherein the mesoporous nitridated material is formed using ammonia and comprises a nitridated metal oxide material, a nitridated non-metal oxide material, or a combination thereof; and
exposing the mesoporous nitridated material to $CO_2$, wherein at least a portion of the $CO_2$ is captured by the nitridated material.

13. The method of claim 12, wherein the nitridated metal oxide material has a plurality of metal oxide-amine groups.

14. The method of claim 12, wherein the nitridated non-metal oxide material has a plurality of non-metal oxide-amine groups.

15. The method of claim 12, wherein the mesoporous nitridated material further comprises a nitridated silica material having a plurality of silicon amine groups, silicon-oxynitride groups, or both.

16. The method of claim 15, wherein the nitridated silica material further comprises silica nanoparticles.

17. A method of removing $CO_2$, comprising:
providing a mesoporous nitridated material, wherein the mesoporous nitridated material comprises a nitridated metal oxide material, a nitridated non-metal oxide material, or a combination thereof, wherein the mesoporous nitridated material further comprises a nitridated silica material having a plurality of silicon amine groups, silicon-oxynitride groups, or both, wherein the nitridated silica material further comprises fibrous silica nanoparticles; and
exposing the mesoporous nitridated material to $CO_2$, wherein at least a portion of the $CO_2$ is captured by the nitridated material.

* * * * *